(12) United States Patent
Moore

(10) Patent No.: US 6,354,899 B1
(45) Date of Patent: *Mar. 12, 2002

(54) FRIT-SEALING PROCESS USED IN MAKING DISPLAYS

(76) Inventor: Chad Byron Moore, 7 W. 4$^{th}$ St., Corning, NY (US) 14830

(*) Notice: Subject to any disclaimer, the term of this patent is extended or adjusted under 35 U.S.C. 154(b) by 0 days.

This patent is subject to a terminal disclaimer.

(21) Appl. No.: 09/299,371

(22) Filed: Apr. 26, 1999

(51) Int. Cl.$^7$ .............................. H01J 9/26; H01J 9/32

(52) U.S. Cl. .......................................... 445/25; 445/43

(58) Field of Search ............................... 445/24, 25, 43

(56) References Cited

U.S. PATENT DOCUMENTS

| | | | |
|---|---|---|---|
| 2,209,747 A | 7/1940 | Eisler | 178/6.5 |
| 3,521,941 A | 7/1970 | Deb et al. | 350/160 |
| 3,767,392 A | 10/1973 | Ota | 96/1 |
| 3,964,050 A | 6/1976 | Mayer | 340/324 |
| 4,027,188 A | 5/1977 | Bergman | 313/220 |
| 4,038,577 A | 7/1977 | Bode et al. | 313/188 |
| 4,126,854 A | 11/1978 | Sheridon | 340/373 |
| 4,554,537 A | 11/1985 | Dick | 340/775 |
| 4,717,949 A | 1/1988 | Eichenlaub | 358/3 |
| 4,728,864 A | 3/1988 | Dick | 315/169.3 |
| 4,833,463 A | 5/1989 | Dick et al. | 340/775 |
| 4,896,149 A | 1/1990 | Buzak et al. | 340/794 |
| 5,036,317 A | 7/1991 | Buzak | 340/783 |
| 5,077,553 A | 12/1991 | Buzak | 340/794 |
| 5,086,297 A | 2/1992 | Mjyake et al. | 340/759 |

(List continued on next page.)

FOREIGN PATENT DOCUMENTS

| | | | | |
|---|---|---|---|---|
| JP | 10149763 | 2/1998 | ............. | H01J/9/02 |
| JP | 11003649 | 6/1999 | ............. | H01J/9/02 |

OTHER PUBLICATIONS

Dick, G. W. "Three–Electrode per PEL AC Plasma Display Panel", 1985 International Display Research Conf., pp 45–50.
Mayer, W. 1972, "Tubular AC Plasma Panels", IEEE Conf. Display Devices, Conf. Rec., New York, pp 15–18.
Storm, R., 1974, "32–Inch Graphic Plasma Display Module", SID Int. Symposium, San Diego, pp 122–123.
Moore, C. et al, "Fiber Plasma Display", SID '97 Digest, pp. 1055–1058.
Trotter, D. M. et al, "PALC Displays Made From Electroded Glass Fiber Arrays", SID '97 Digest, pp. 379–382.
Weber et al, 1996, "Materials and Manufacturing Issues of Color Plasma Displays", MRS Bulletin, 65, 1996.
Mikoshiba, Shigeo, SID Int. Symp. Seminar Lectaure Notes, M–4, 1998.
Koiwa et al, 1995, Preparation of MgO Protective Layer for AC–Type Plasma Display Panel by Means of Screen–Printing; J. Electrochem. Soc., vol. 142, No. 5, pp. 1396–1401.
Koiwa et al, 1996, MgO Powders for Protective Layer of Alternating Current Plasma Display Panel, Electronics and Communications in Japan, Part 2, vol. 79, No. 4, pp. 55–66.
Koiwa, I., 1996, "A Study on MgO pOwder and MgO Liquid Binder in the Screen–Printed Protective Layer for AC–P-DPs" IEICE Trans. Electron. vol. E79–C, No. 4, pp 580–585.

*Primary Examiner*—Kenneth J. Ramsey
*Assistant Examiner*—Mariceli Santiago
(74) *Attorney, Agent, or Firm*—Brown & Michaels, PC

(57) ABSTRACT

A process for frit-sealing together a panel of a fiber-based information display includes assembling the panel and sealing, after the step of assembling, the panel by forcing a glass frit to flow between the two glass plates that comprise the panel using narrow strips of glass. The glass frit-seals the top and bottom glass plates together and covers the wire electrodes at the end of the fibers to dielectrically isolate them from each other. The process of assembling and frit-sealing the panel is particularly suitable for use in an information display, such as plasma emissive displays, plasma addressed liquid crystal displays, and field emissive displays.

14 Claims, 25 Drawing Sheets

U.S. PATENT DOCUMENTS

| | | | |
|---|---|---|---|
| 5,272,472 A | 12/1993 | Buzak | 345/60 |
| 5,313,423 A | 5/1994 | Sato et al. | 365/200 |
| 5,440,201 A | 8/1995 | Martin | 313/582 |
| 5,446,344 A | 8/1995 | Kanazawa | 315/169.4 |
| 5,457,574 A | 10/1995 | Eichenlaub | 359/619 |
| 5,661,500 A | 8/1997 | Shinoda et al. | 345/60 |
| 5,674,553 A | 10/1997 | Shinoda et al. | 427/68 |
| 5,739,801 A | 4/1998 | Sheridon | 345/84 |
| 5,745,086 A | 4/1998 | Weber | 345/63 |
| 5,790,086 A | 8/1998 | Zelitt | 345/32 |
| 5,838,494 A | 11/1998 | Araki | 359/455 |
| 5,961,804 A | 10/1999 | Jacobson | 204/606 |
| 5,984,747 A | 11/1999 | Bhagavatula et al. | 445/24 |

Process Flow

Prepare glass plates
- cut glass plates to size
  (top plate larger than bottom in both directions)
- edge glass to increase strength
- drill hole in bottom plate for evacuation port

↙ ↘

Fabricate bottom fiber preform
- Make opal glass blanks
- Extrude blank to form preform

↓

Draw bottom fiber onto rotating drum
- Load preform into draw
- Place wires through holes in preforms
- Prepare drum
- Draw fiber containing wire onto drum channel out
- Repeat process to form 3 drums with bottom fiber

↓

Coat each individual drum with RGB phosphors
- Spray coat fiber channels on drum with phosphor
- Scrap phosphor off barrier ribs with knife edge
- Repeat for each 3 color (red, green & blue)

↓

Rewind 3 color fibers onto single drum
- Prepare take-up drum (metal bars in grooves)
- Sequentially rewind 3 color phosphor coated fibers onto a single drum in RGB fashion

↓

Form sheets of bottom fibers
- Clamp metal bars over first set
- Cut fibers between sets of metal bars
- Remove fibers from drum as sheet

Fabricate top fiber preform
- Make high dielectric glass blanks
- Extrude blank to form preform

↓

Draw top fiber onto rotating drum
- Load preform into draw
- Place wires through holes in preform
- Prepare drum (metal bars in groove)
- Draw fiber containing wire onto drum plasma surface facing outward

↓

Coat fiber with MgO
- Spray coat fibers with MgO

↓

↓

↓

↓

Form sheets of top fiber
- Clamp metal bars over first set
- Cut fibers between sets of metal bars
- Remove fibers from drum as sheet

↘ ↙

Assemble Panel
- Place top fibers array onto top plate
- Place bottom fiber array onto top fiber array orthogonal to it
- Place bottom place over fiber arrays Remove glass fiber from wire electrodes around perimeter of panel
Clamp frit containing glass tabs around perimeter of panel
Apply evacuation tube and clamp frit containing washer around tube
Place in furnace and frit seal the display
Evacuate, back fill and seal off tube
Connect wires to electronics

Figure 25

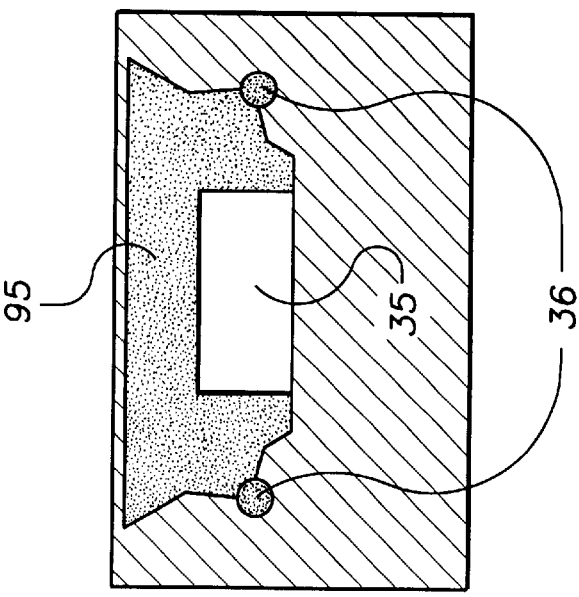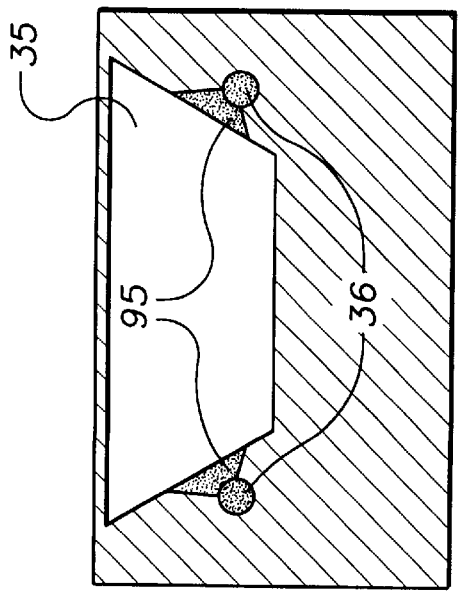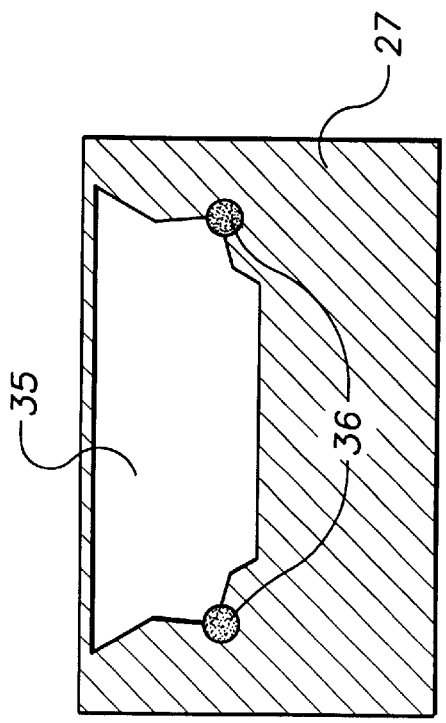

FRIT-SEALING PROCESS USED IN MAKING DISPLAYS

FIELD OF THE INVENTION

The invention pertains to the field of fiber-based displays and methods of manufacture. More particularly, the invention pertains to fiber-based full-color plasma, plasma addressed liquid crystal, and field emission displays and their method of manufacture.

BACKGROUND OF THE INVENTION

All electronic display technologies are composed of a large array of display picture elements, called pixels arranged in a two-dimensional matrix. Color is added to these displays by subdividing each pixel element into three-color subpixels. The electronic display technologies can be further divided into a category known as flat-panel displays. The basic structure of a flat-panel display comprises two glass plates with a conductor pattern of electrodes on the inner surfaces of each plate with additional structure to separate the plates or create a channel. The conductors are configured in a x-y matrix with horizontal and vertical electrodes deposited at right angles from each other to allow for matrix addressing. Examples of flat-panel displays include plasma displays, plasma addressed liquid crystal (PALC) displays, field emission displays (FED), and the like.

Plasma display panels (PDP) have been around for about 30 years, however they have not seen widespread commercial use. The main reasons are the short lifetime, low efficiency, and cost of the color plasma displays. Most of the performance issues were solved with the invention of the three electrode surface discharge AC plasma display (G. W. Dick, "Three-Electrode per PEL AC Plasma Display Panel", 1985 International Display Research Conf., pp. 45–50; U.S. Pat. Nos. 4,554,537, 4,728,864, 4,833,463, 5,086,297, 5,661,500, and 5,674,553). The new three electrode surface discharge structure advances many technical attributes of the display, but its complex manufacturing process and detailed structure makes manufacturing complicated and costly.

Currently, plasma display structures are built up layer by layer on specialty glass substrates using many complex processing steps. FIG. 1 illustrates the basic structure of a surface discharge AC plasma display made using standard technology. The PDP can be broken down into two parts: top plate 10 and bottom plate 20. The top plate 10 has rows of paired electrodes referred to as the sustain electrodes 11a, 11b. The sustain electrodes are composed of wide transparent indium tin oxide (ITO) electrodes 12 and narrow Cr/Cu/Cr bus electrodes 13. These electrodes are formed using sputtering and multi-layer photolithography. The sustain electrodes 11 are covered with a thick (25 $\mu$m) dielectric layer 14 so that they are not exposed to the plasma. Silk-screening a high dielectric paste over the surface of the top plate and consolidating it in a high temperature process step forms this dielectric layer 14. A magnesium oxide layer (MgO) 15 is deposited by electron-beam evaporation over the dielectric layer to enhance secondary emission of electrons and improve display efficiency. The bottom plate 20 has columns of address electrodes 21 formed by silk-screening silver paste and firing the paste in a high temperature process step. Barrier ribs 22 are then formed between the address electrodes 21. These ribs 22, typically 50 $\mu$m wide and 120 $\mu$m high, are formed using either a greater than ten layer multiple silk-screening process or a sandblasting process. In the sandblasting method, barrier rib paste is blade coated on the glass substrate. A photoresist film laminated on the paste is patterned by photolithography. The rib structure is formed by sandblasting the rib paste between the exposed pattern, followed by removal of the photoresist layer and a high temperature consolidation of the barrier rib 22. Alternating red 23R, green 23G, and blue 23B phosphors are silk-screened into the channels between the barrier ribs to provide color for the display. After silk-screening the phosphors 23, the bottom plate is sandblasted to remove excess phosphor in the channels. The top and bottom plates are frit sealed together and the panel is evacuated and backfilled with a gas mixture containing xenon.

The basic operation of the display requires a plasma discharge where the ionized xenon generates ultraviolet (UV) radiation. This UV light is absorbed by the phosphor and converted into visible light. To address a pixel in the display, an AC voltage is applied across the sustain electrodes 11 which is large enough to sustain a plasma, but not large enough to ignite one. A plasma is a lot like a transistor, as the voltage is increased nothing happens until a specific voltage is reached where it turns on. Then an additional short voltage pulse is applied to the address electrode 21, which adds to the sustain voltage and ignites the plasma by adding to the total local electric field, thereby breaking down the gas into a plasma. Once the plasma is formed, electrons are pulled out of the plasma and deposited on the MgO layer 15. These electrons are used to ignite the plasma in the next phase of the AC sustain electrodes. To turn the pixel off, an opposite voltage must be applied to the address electrode 21 to drain the electrons from the MgO layer 15, thereby leaving no priming charge to ignite the plasma in the next AC voltage cycle on the sustain electrodes. Using these priming electrons, each pixel can be systematically turned on or off. To achieve gray levels in a plasma display, each video frame is divided into 8 bits (256 levels) and, depending on the specific gray level, the pixels are turned on during these times.

There are presently three address modes of operation for a standard AC plasma display: (1) erase address (U.S. Pat. No. 5,446,344), (2) write address (U.S. Pat. No. 5,661,500), and (3) ramped voltage address (U.S. Pat. No. 5,745,086). The prior art wave forms for the matrix erase address waveform is shown in FIG. 2. In the initial address cycle CA in the line display period T a discharge sustain pulse PS is applied to the display electrode 11a and simultaneously a writing pulse in applied to the display electrode 11b. In FIG. 2, the inclined line in the discharge sustain pulse PS indicates that it is selectively applied to lines. By this operation, all surface discharge cells are made to be in a written state.

After the discharge sustain pulses PS are alternately applied to the display electrodes 11a and 11b to stabilize the written states, and at an end stage of the address cycle CA, an erase pulse PD is applied to the display electrode 11b and a surface discharge occurs.

The erase pulse PD is short in pulse width, 1 $\mu$s to 2 $\mu$s. As a result, wall charges on a line as a unit are lost by the discharge caused by the erase pulse PD. However, by taking a timing with the erase pulse PD, a positive electric field control pulse PA having a wave height Va is applied to address electrodes 21 corresponding to unit luminescent pixel elements to be illuminated in the line.

In the unit luminescent pixel elements where the electric field control pulse PA is applied, the electric field due to the erase pulse PD is neutralized so that the surface discharge for erase is prevented and the wall charges necessary for display remain. More specifically, addressing is performed by a selective erase in which the written states of the surface discharge cells to be illuminated are kept.

In the display period CH following the address cycle CA, the discharge sustain pulse PS is alternately applied to the display electrodes 11a and 11b to illuminate the phosphor layers 23. The display of an image is established by repeating the above operation for all line display periods.

The prior art waveforms for the matrix write address waveform is shown in FIG. 3. At the initial stage of the address cycle CA, a writing pulse PW is applied to the display electrode 11a at the same time a sustain pulse is applied to display electrode 11b so as to make the potential thereof large enough to place each pixel element in the line in a write state. The write pulse PW is followed by two sustain pulses PS to condition the plasma cells. A narrow relative pulse of width t1 is then applied to each pixel element in the line to erase the wall charge. The narrow pulse is obtained by applying a voltage Vs on the sustain electrode 11a a time t1 before a voltage Vs is applied to sustain electrode 11b. In the display line, a discharge sustain pulse PS is selectively applied to the display electrode 11b and a selective discharge pulse PA is selectively applied to the address electrodes 21 corresponding to the unit luminescent pixel elements to be illuminated in the line depending on the image. By this procedure, opposite discharges between the address electrodes 21 and the display electrode 11b or selective discharges occur, so that the surface discharge cells corresponding to the unit luminescent pixel elements to be illuminated are placed into write states and the addressing finishes.

In the display period CH following the address cycle CA, the discharge sustain pulse PS is alternately applied to the display electrodes 11a and 11b to illuminate the phosphor layers 23. The display of an image is established by repeating the above operation for all line display periods.

The prior art wave forms for the matrix ramped voltage address waveform is shown in FIG. 4. During the setup period a voltage ramp PE is applied to the sustain electrode 11b which acts to erase any pixel sites which are in the ON state. After the initial erase a slowly rising ramp potential Vr is applied to the sustain electrode 11a then raised potential is applied to sustain electrode 11b and a falling potential Vf is applied to the sustain electrode 11a. The rising and falling voltages produces a controlled discharge causing the establishment of standardized wall potentials at each of the pixel sites along the sustain line. During the succeeding address pulse period, address data pulses PA are applied to selected column address lines 21 while sustain lines 11b are scanned PSc. This action causes selective setting of the wall charge states at pixel sites along a row in accordance with applied data pulses.

Thereafter, during the following sustain period an initial longer sustain pulse PSL is applied to the sustain electrode 11a to assure proper priming of the pixels in the written state. The remaining sustaining period is composed of discharge sustain pulses PS alternately applied to the display electrodes 11a and 11b to illuminate the phosphor layers 23. The display of an image is established by repeating the above operation for all line display periods.

A number of methods have been proposed to create the structure in a plasma display, such as thin and thick film processing, photolithography, silk screening, sand blasting, and embossing. However, none of the structure forming techniques provides as many advantages as that of using fibers. Small hollow tubes were first used to create structure in a panel by W. Mayer, "Tubular AC Plasma Panels," 1972 IEEE Conf. Display Devices, Conf. Rec., New York, pp. 15–18, and R. Storm, "32-Inch Graphic Plasma Display Module," 1974 SID Int. Symposium, San Diego, pp. 122–123, and included in U.S. Pat. Nos. 3,964,050 and 4,027,188. These early applications where focused on using an array of gas filled hollow tubes to produce the rib structure in a PDP. In addition, this work focused on adding the electrode structure to the glass plates that sandwiched the gas filled hollow tubes. Since this early investigation no further work was published on further developing a fiber or tube technology until that published by C. Moore and R. Schaeffler, "Fiber Plasma Display", SID '97 Digest, pp. 1055–1058.

The present invention is also directed to PALC displays and FEDs. Tektronix, Inc., has disclosed and demonstrate the use of plasma channels to address a liquid crystal display. For example, U.S. Pat. Nos. 4,896,149, 5,036317, 5,077,553, 5,272,472, 5,313,423, the specifications of which are all hereby incorporated by reference, disclose such structures. The only public knowledge of fibers for PALC displays was published by D. M. Trotter, C. B. Moore, and V. A. Bhagavatula, "PALC Displays Made from Electroded Glass Fiber Arrays", SID '97 Digest, pp. 379–382. No known publications exist for using fibers for FEDs.

The PALC display, illustrated in FIG. 5, relies on the highly non-linear electrical behavior of a relatively low pressure (10–100 Torr) gas, usually He, confined in many parallel channels. A pair of parallel electrodes 36 are deposited in each of the channels 35, and a very thin glass microsheet 33 forms the top of the channels. Channels 35 are defined by ribs 34, which are typically formed by screen printing or sand blasting. A liquid crystal layer 32 on top of the microsheet 33 is the optically active portion of the display. A cover sheet 30 with transparent conducting electrodes 31 running perpendicular to the plasma channels 35 lies on top of the liquid crystal 32. Conventional polarizers, color filters, and backlights, like those found in other liquid crystal displays, are also commonly used.

Because there is no ground plane, when voltages are applied to the transparent electrodes 31, the voltages are divided among the liquid crystal 32, the microsheet 33, the plasma channel 35, and any other insulators intervening between the transparent electrode 31 and whatever becomes the virtual ground. As a practical matter, this means that if there is no plasma in the plasma channel 35, the voltage drop across the liquid crystal 32 will be negligible, and the pixels defined by the crossings of the transparent electrodes 31 and the plasma channels 35 will not switch. If, however, a voltage difference sufficient to ionize the gas is first applied between the pair of electrodes 36 in a plasma channel 35, a plasma forms in the plasma channel 35 so that it becomes conducting, and constitutes a ground plane. Consequently, for pixels atop this channel, the voltages will be divided between the liquid crystal 32 and the microsheet 33 only. This places a substantial voltage across the liquid crystal 32 and causes the pixel to switch; therefore, igniting a plasma in the channel causes the row above the channel to be selected. Because the gas in the channels is non-conducting, the rows are extremely well isolated from the column voltages unless selected. This high nonlinearity allows very large numbers of rows to be addressed without loss of contrast.

SUMMARY OF THE INVENTION

Briefly stated, a process for frit-sealing together a panel of a fiber-based information display includes assembling the panel and sealing, after the step of assembling, the panel by forcing a glass frit to flow between the two glass plates that comprise the panel using narrow strips of glass. The glass frit-seals the top and bottom glass plates together and covers the wire electrodes at the end of the fibers to dielectrically isolate them from each other. The process of assembling and frit-sealing the panel is particularly suitable for use in an information display, such as plasma emissive displays, plasma addressed liquid crystal displays, and field emissive displays.

Constructing displays using fibers has many different benefits and advantages. The economic benefits of the fiber-based plasma display technology compared to the standard plasma display technology is that fibers result in 70% lower capital costs, 50% lower manufacturing costs, and 20% lower materials costs. These lower costs are realized as a result of the manufacturing advantages. Fiber-based displays have 50% fewer process steps, no multi-level alignment steps, higher yields, simpler process steps, no large vacuum process equipment or photolithography steps, no size limit, and no shape limit. The fiber-based technology also yields performance advantages. Tight control of the fiber size and shape (intra-pixel control) along with the location of the wire electrodes leads to a fine control of the electric fields within the display. Creating the optimum electric field increases the discharge efficiency in a plasma display by a factor of two. Controlling the electric field also allows a reduction of ion bombardment on the phosphors, hence increasing the lifetime of the display. It is very easy to control the intra-pixel dimensions in a fiber plasma display; however, it is quite difficult and requires several extra steps for the standard process to achieve such control. The fiber-based technology also provides environmental advantages. Since the glass fibers can be made from a lead-free glass, there is a large reduction in the lead content of the display compared to standard plasma displays and CRTs. A completely lead-free display could even be realized if lead-free frits can be used. The innovative fiber-based technology eliminates the waste products associated with traditional photolithographic processes and the associated problems of treating the etching solution-contaminated rinse liquids. Also, there are none of the by-products from sand blasting glass. The bottom line is the fiber plasma technology is a cleaner, more environmentally safe manufacturing operation.

BRIEF DESCRIPTION OF THE DRAWINGS

FIG. 25 illustrates a typical process flow for fiber-based plasma display.

FIG. 33A schematically shows a cross-section of the bottom fiber in a PALC display partially formed using a loss glass process.

FIG. 33B schematically shows a cross-section of the bottom fiber in a PALC display partially formed using a loss glass process.

FIG. 33C schematically shows a cross-section of the bottom fiber in a PALC display partially formed using a loss glass process.

DESCRIPTION OF THE PREFERRED EMBODIMENT

In the following description it is understood that the such terms as "top" refers to the section or sections of a panel in a display that is closest to the viewer, whereas "bottom" refers to the section or sections of a panel in the display that is on the half away from the viewer.

Figure 6:
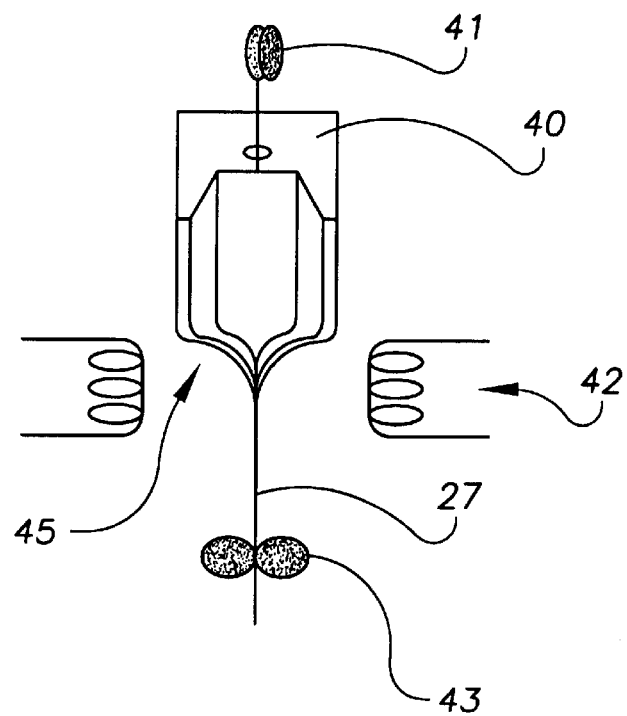
FIG. 6 illustrates the fiber draw process.
Figure 8:
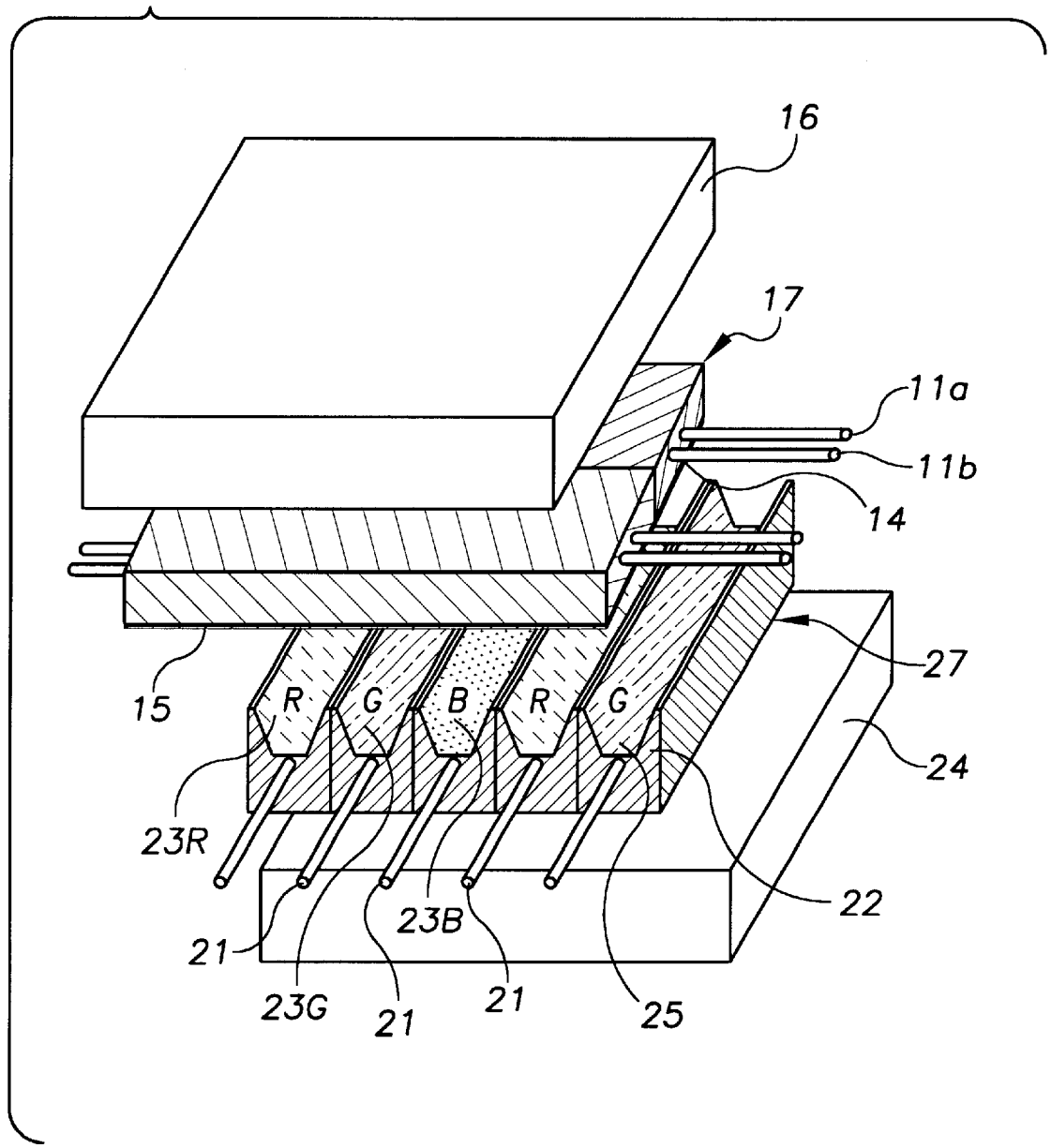
FIG. 8 schematically shows the fiber-based plasma display with all functions of the display integrated into fibers with embedded wire electrodes in accordance with the present invention.
Figure 9:
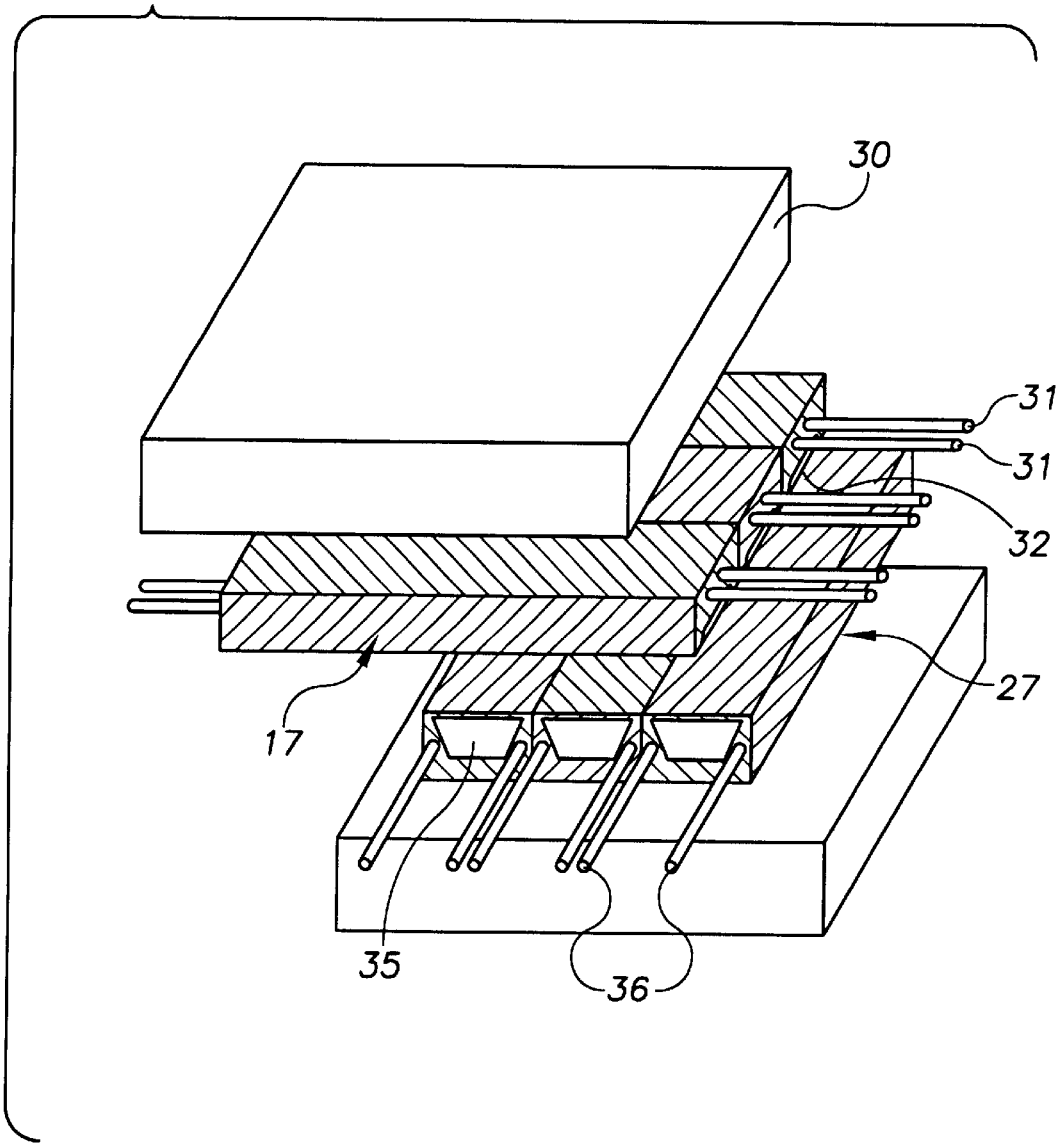
FIG. 9 schematically shows the fiber-based PALC display with all functions of the display integrated into the fibers with embedded wire electrodes in accordance with the present invention.

The key invention is that all structure of each row and column of the display panel is contained within each fiber of both arrays. Therefore, the entire functionality of the display is contained within each fiber of the display. Each individual fiber in the top fiber array contains all the structure of each row of the display and each individual fiber in the bottom fiber array contains all the structure of each column of the display. In the invention, glass fibers with wire electrodes are formed by drawing fiber 27 from an appropriately-shaped glass preform 40, as illustrated in FIG. 6. The fibers are assembled into arrays and placed between two glass plates to form the structure of an information display. The glass preform 40 in which the fiber is drawn from is formed using hot glass extrusion, where a billot of glass is loaded into a high temperature press and it is forced out through a die to form an appropriately-shaped glass preform 40. The fiber 27 or 17 can also be formed directly from the hot glass extrusion process by either extruding the appropriately-sized and shaped fiber or drawing the fiber directly from the preform as it exits the hot glass extrusion machine. Examples of fiber-based information displays are shown in FIG. 8 for a plasma display and FIG. 9 for a PALC display, similar fiber-based displays could be constructed for other flat-panel displays such as FEDs.

Glass fiber 27 (or 17) is drawn from a large glass preform 40, which is formed using hot glass extrusion. Metal wire electrode(s) 41 are fed through a hole in the glass preform and are co-drawn with the glass fiber (FIG. 6). The glass around the metal wire is only drawn down enough to pull the wire and does not actually fuse to the wire. To draw fiber at a high draw speed (5 to 20 m/sec) 43 the temperature of the furnace 42 has to be high enough to lower the viscosity of the glass in the root 45 to around $1\times10^5$ Poise. This low viscosity places restrictions on the complicated shape preforms to produce fibers of the same shape. The draw forces in the root 45 of the draw tend to cause the corners to bow inward at the top of the root. The root of the fiber goes through a point of inflection, where the force of the draw tends to cause the corners to bow outward at the bottom of the root. The outward force at the bottom of the root tends to rotate a "barrier rib" section of a bottom fiber 27 outward to a 120° angle. To counteract the bowing outward of the "barrier rib" section, a triangular section is added at a 120° angle to the bottom of the plasma channel to the inside of the barrier ribs (see FIG. 7A). The larger base on the barrier rib keeps it from folding outward during the draw process. In the preferred embodiment the bottom fiber preform should be designed such that angle between the bottom of the plasma channel and the side of the barrier rib is >110°, and more preferred >115°, and most preferred >120°. Another area in a preform that effects the final shape of a fiber is the thickness of glass from the bottom of the fiber to the bottom of the plasma channel. The same forces in the root 45 of the draw act to open up the plasma channel depending on the thickness of glass below the bottom of the plasma channel. If the thickness of glass below the plasma channel is equal to or greater than the depth of the plasma channel (or height of barrier ribs) then the shape of the plasma channel will be held in the draw process. In the preferred embodiment the bottom fiber preform should be designed such that the percent of glass from the bottom of the plasma channel to the bottom of the fiber is >50% of the height of the barrier ribs, and more preferred >75%, and most preferred >100%.

A further embodiment of the invention is to use a loss glass process to generate fine features and hold tight tolerances in the fiber profile. To hold the proper shape during the draw process, a dissolvable glass can be added to the preform and removed from the fiber after the draw process. Typical liquid solutions to dissolve the glass include vinegar and lemon juice. The dissolvable glass can be removed during the draw process before the fiber is wound onto the drum, or the glass can be removed while the fibers are wrapped on the drum, or the glass can be removed after the fibers have been removed from the drum as a sheet. The dissolvable glass can be used to generate fine features in the top or bottom fibers, such as very thin barrier ribs with straight sidewalls. In part, a dissolvable glass can be used to generate any shape or tolerance in a fiber-based display. Using a loss glass process to control fiber shape will be discussed further with reference to FIG. 33.

Figure 7A:
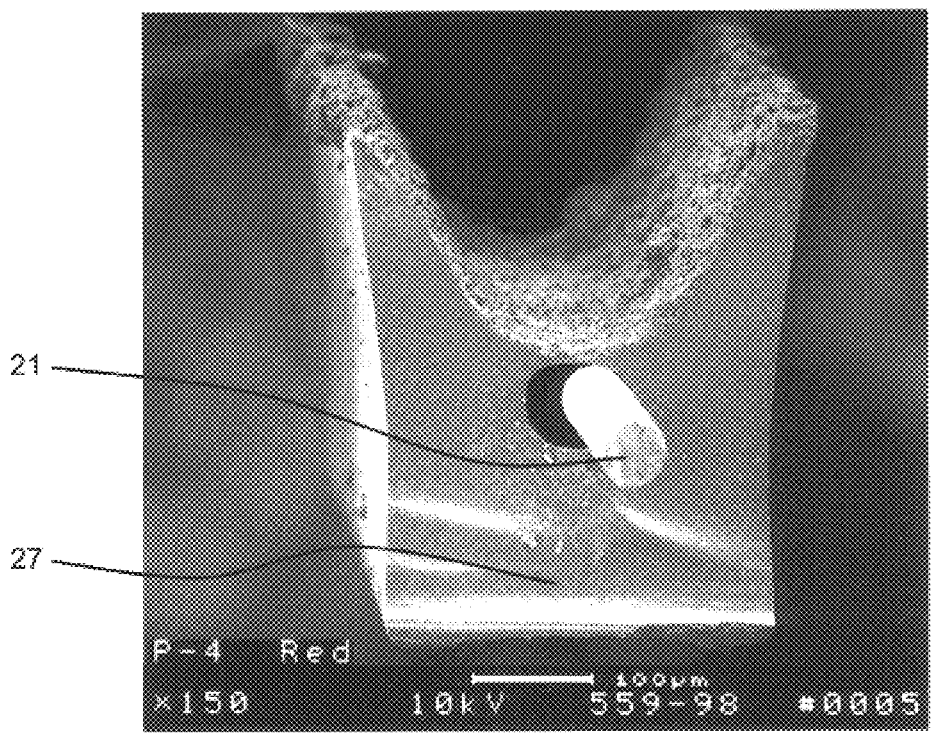
FIG. 7A shows a SEM of a bottom fiber with phosphor coating.
Figure 7B:
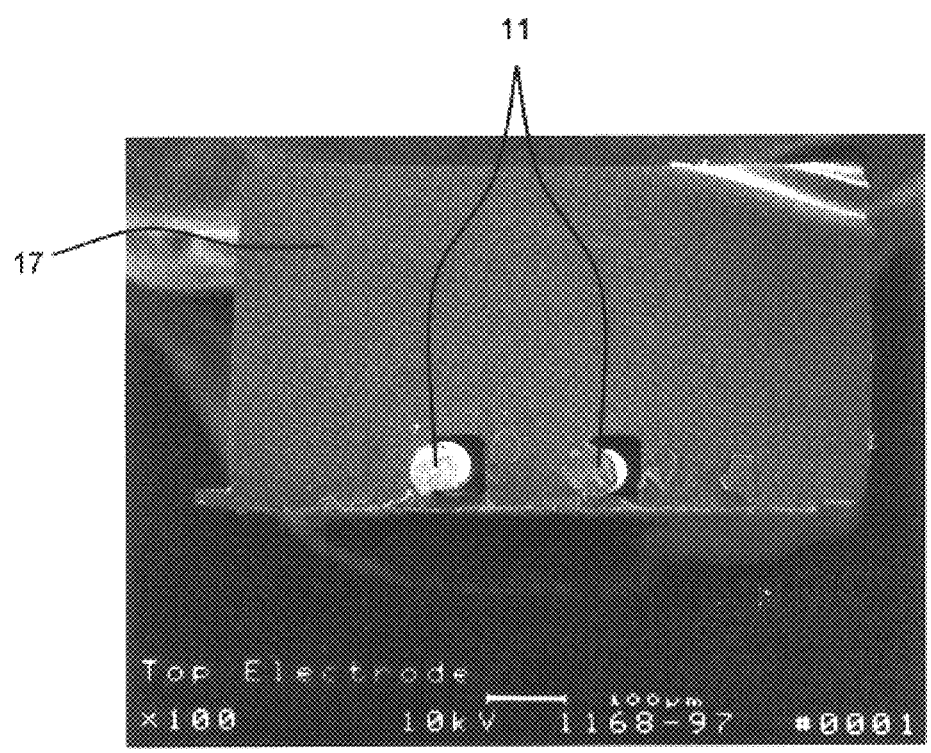
FIG. 7B shows a SEM of a top fiber.

The innovation of the fiber-based plasma display is that the entire functionality of the standard plasma display (FIG. 1) is created by replacing the top and bottom plates with respective sheets of top 17 and bottom 27 fibers (FIG. 8) sandwiched between plates of soda lime glass 16 and 24. Each row of the bottom plate is composed of a single fiber 27 that includes the address electrode 21, barrier ribs 22, plasma channel 25 and the phosphor layer 23 (FIG. 7A). Each column of the top plate is composed of a single fiber 17 that includes two sustain electrodes 11 and a thin built-in dielectric layer 14 over the electrodes which is covered with a MgO layer 15 (FIG. 7B). Therefore, the entire function of the display is contained within the fibers. Sheets of top 17 and bottom 27 fibers are placed between two glass plates 16 and 24 and the ends of the glass fibers are removed from the wire electrodes. The glass plates are frit sealed together with the wire electrodes extending through the frit seal. The panel is evacuated and backfilled with a xenon-containing gas and the wire electrodes are connected to the drive circuitry. This highly innovative approach is considerably simpler than the existing fabrication technology and comparisons are discussed in greater detail below.

The ability to fabricate large displays with the fiber technology will set a precedent for plasma displays since the current industry capability is only 50" diagonal. In standard plasma display fabrication, the display size is determined by the size of the masks used in the numerous patterned photolithography steps since the display is built up layer by layer on a glass substrate. Thus, larger panel sizes require scale-up of processing equipment. It is also expected that considerably larger sizes (>80" diagonal) will not be possible by conventional technology due to technical difficulties in aligning the fine patterns over large areas. These difficulties arise because of screen stretching during the silk-screening steps and feature distortion during the high temperature process steps due to glass compaction (Weber and Birk, MRS Bulletin, 65, 1996).

Figure 10A:
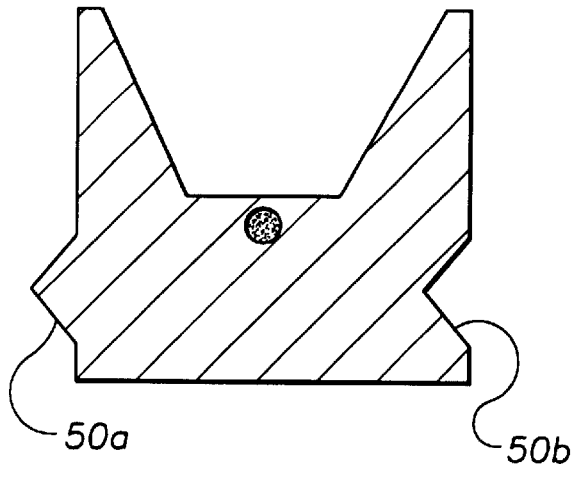
FIG. 10A schematically shows a cross-section of guide structure built into the bottom fiber to interlock the fibers.
Figure 10B:
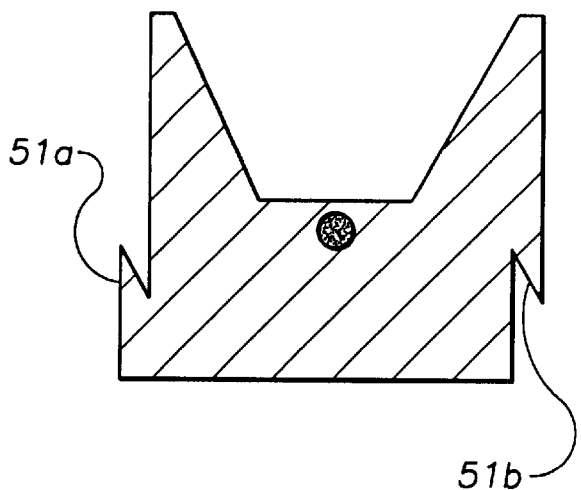
FIG. 10B schematically shows a cross-section of an interlocking structure built into the bottom fiber.
Figure 11A:
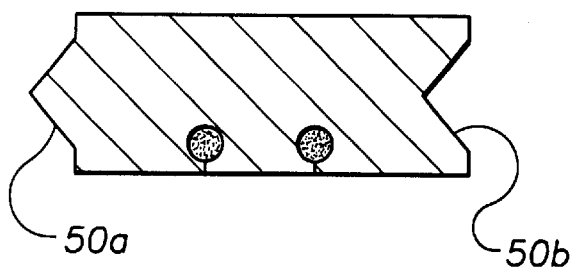
FIG. 11A schematically shows a cross-section of a guide structure built into the top fiber to interlock the fibers.
Figure 11B:
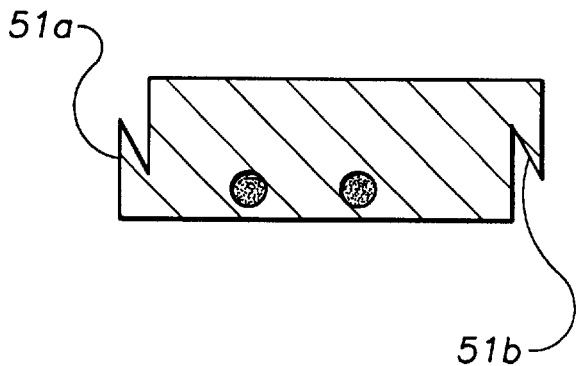
FIG. 11B schematically shows a cross-section of an interlocking structure built into the top fiber.
Figure 12:
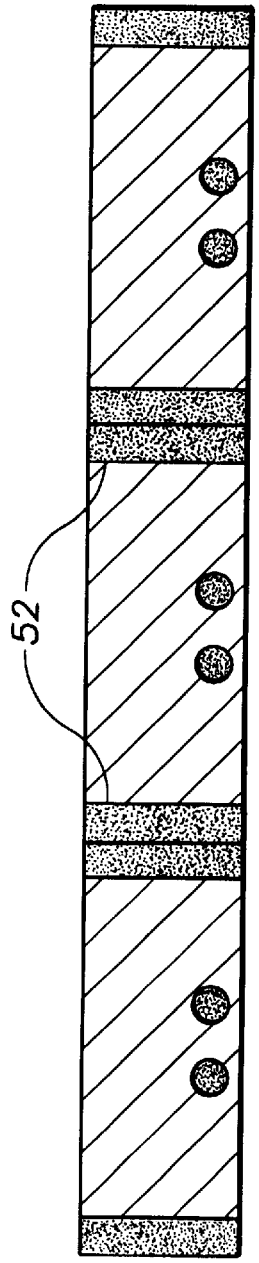
FIG. 12 schematically shows the use of optically absorbing sides in the top fiber to form a black matrix pattern.
Figure 13:
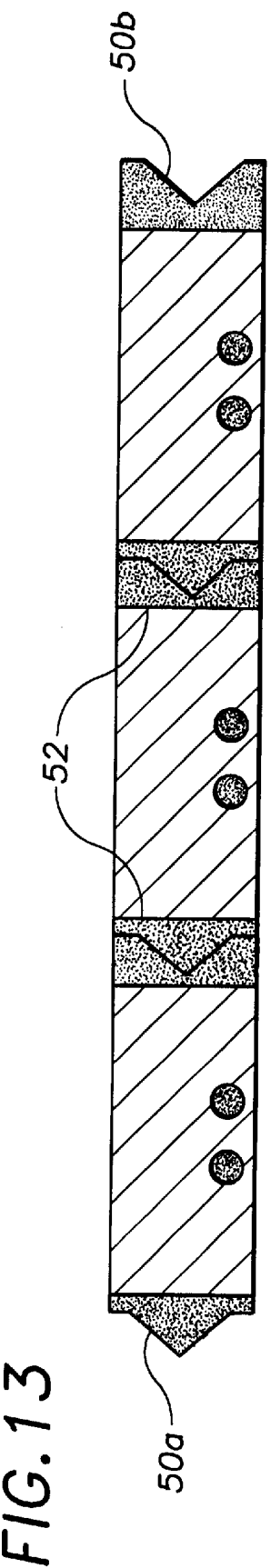
FIG. 13 schematically shows a cross-section of an interlocking structure built into the top fiber and the use of optically absorbing sides in the top fiber to form a black matrix pattern.
Figure 14:
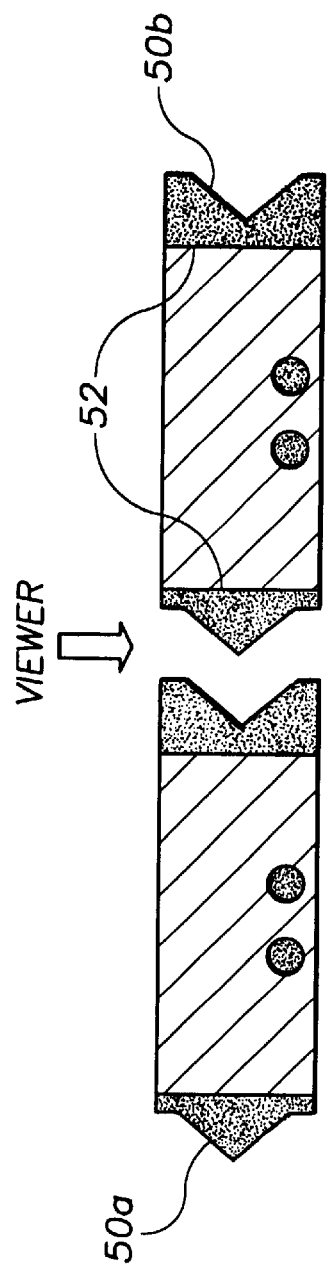
FIG. 14 schematically shows a cross-section of an interlocking structure built into the top fiber and the use of optically absorbing sides in the top fiber to form a black matrix pattern.

With the fiber-based technology of the present invention, the overall size is simply determined by the fiber length, which is independent of processing equipment. High precision arrangement of fibers into fiber array sheets requires only fine control of the size and shape of individual fibers. The requirement of height control of the fiber is typically <10 $\mu$m corresponding to about 10% of the plasma channel depth. To keep the plasma from spreading over the top of the barrier ribs the separation between the top fibers and the barrier ribs should be <10% of the channel depth. The use of an interlocking mechanism 50 and 51 built into the sides of the top or bottom fibers can assist in retaining a consistent fiber height (FIGS. 10 and 11). Fiber guides 50*a* and 50*b* built into the sides of the fibers will set the fibers in an array all at the same height when the fiber array is assembled and tightly compressed together. High precision arrangement of the fibers can also be aided with an interlocking mechanism. Since all of the functions of the display are contained within each fiber, the avoidance of visible gaps between the fibers is the only requirement for tolerance. The interlocking mechanism 51*a* and 51*b* will tend to stitch the fibers together as they are assembled into their perspective arrays. Some relief of the gap tolerance will be achieved by the addition of a black matrix pattern 53 built into the sides of the top plate fiber (FIG. 12). However, the optimum method of avoiding a visible gap between fibers is to combine the interlocking mechanism 50 with the black matrix pattern 52. FIGS. 13 and 14 show the advantage of combining the interlocking mechanism 50 with the black matrix pattern 52. Note that the fibers can be separated a distance equal to the interlocking tab 50*a* before the viewer can see between the fibers.

Figure 15:
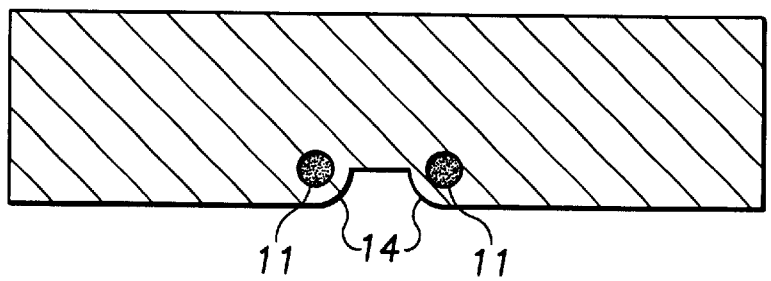
FIG. 15 schematically shows a cross-section of a top fiber in a plasma display with intra-pixel shape.
Figure 16:
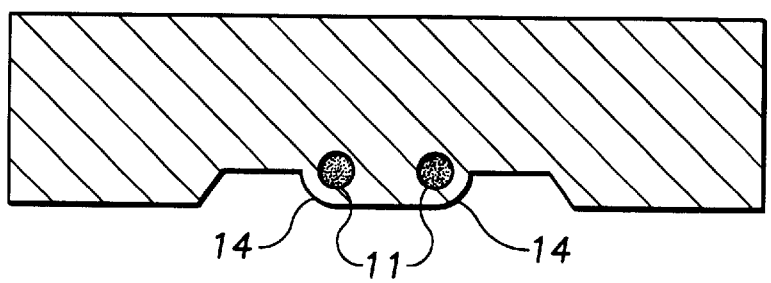
FIG. 16 schematically shows a cross-section of a top fiber in a plasma display with intra-pixel shape.
Figure 17:
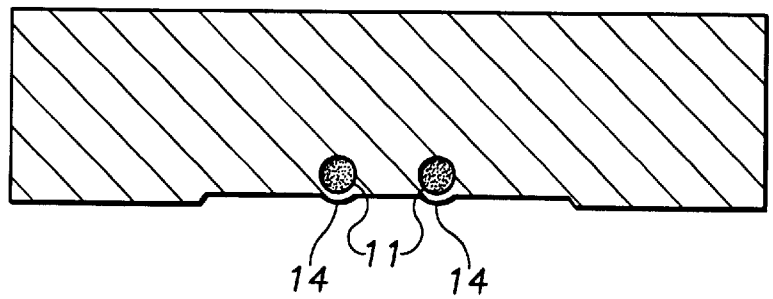
FIG. 17 schematically shows a cross-section of a top fiber in a plasma display with intra-pixel shape.
Figure 18:
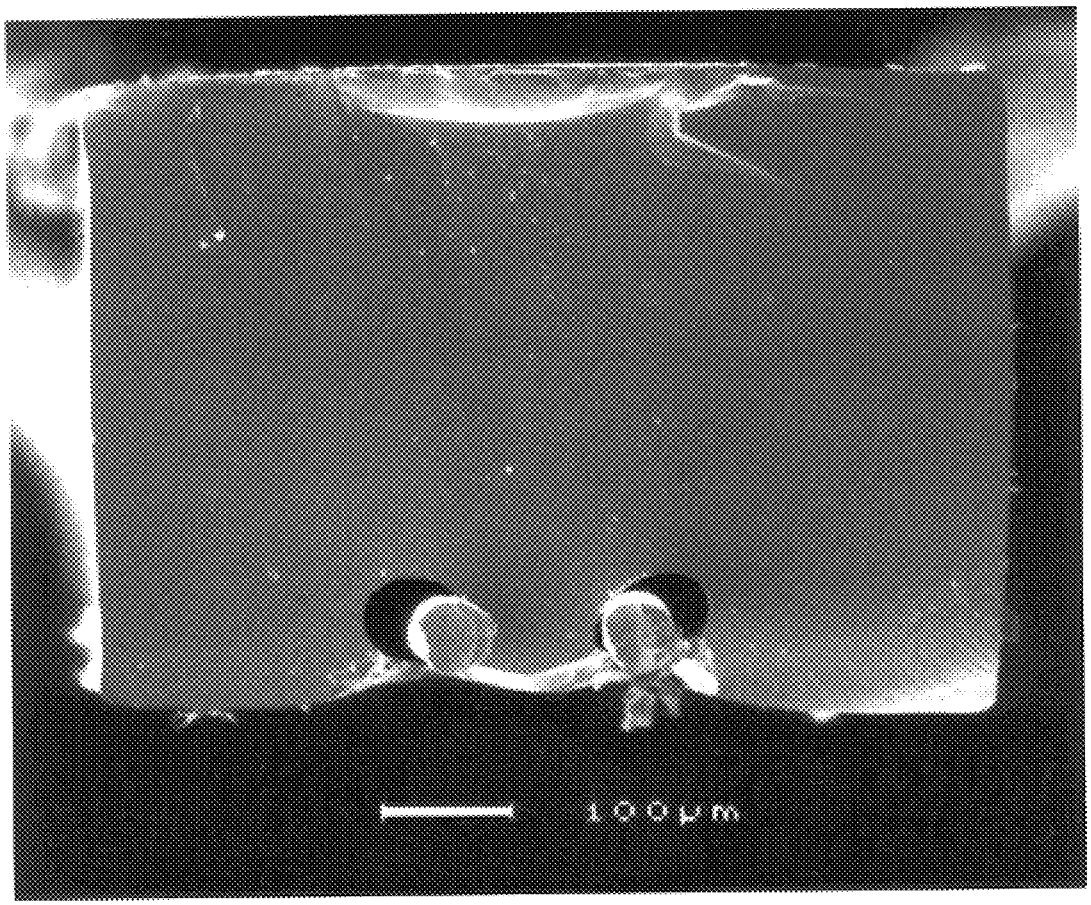
FIG. 18 shows a SEM cross-section of a top fiber with intra-pixel shape.

A technical challenge for the plasma display industry is to increase the efficiency of the displays. Presently, plasma display efficiencies are around one lumen/Watt (1/W) compared to >five 1/W for CRTs. By increasing the discharge efficiency (2×), increasing the phosphor efficiency (2×), and increasing the optical coupling (1.25×), the luminous efficiency of plasma displays can be increased to five 1/W. One of the major advantages the fiber-based technology has over all other technologies is the fine control of the shape of the plasma cell. This fine control is achieved by controlling the shape of the fiber surface and the dielectric layer thickness 14 around the wire electrodes 11 in the top fiber. This "intra-pixel" control will allow a specific electric field to be generated in order to optimize the discharge efficiency. FIGS. 15–17 illustrate the intra-pixel shape of the top fiber by controlling the dielectric layer 14 around the wire electrodes 11. FIG. 18 is a SEM cross-section of a drawn fiber with intra-pixel shape. Note there are many different possible shapes of both the top and bottom fibers and the optimum shape to yield the proper electric field will depend on size of plasma cell, number and separation of sustain electrodes, and amount of plasma damage to the phosphor layer. Stray ion bombardment of the phosphors, which limit their lifetime, can also be reduced by optimizing the intra-pixel shape. Phosphor lifetime, or the amount of time before the luminance is decreased by 50%, and plasma efficiency are presently the two technical challenges facing the plasma display industry and the fiber-based technology is most suited to solve these issues because of the ability of controlling the intra-pixel shape.

Figure 19:
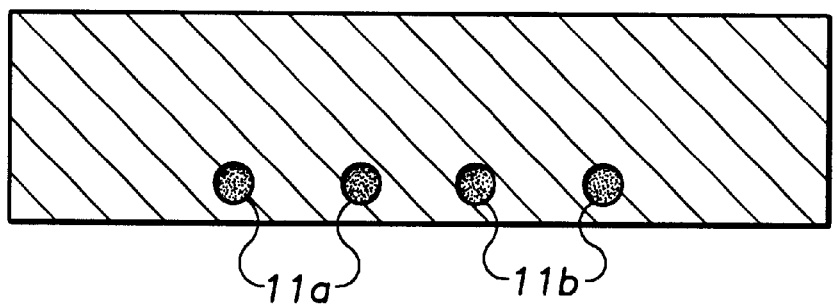
FIG. 19 schematically shows a cross-section of a top fiber in a plasma display with two wire electrodes per sustain electrode.
Figure 20:
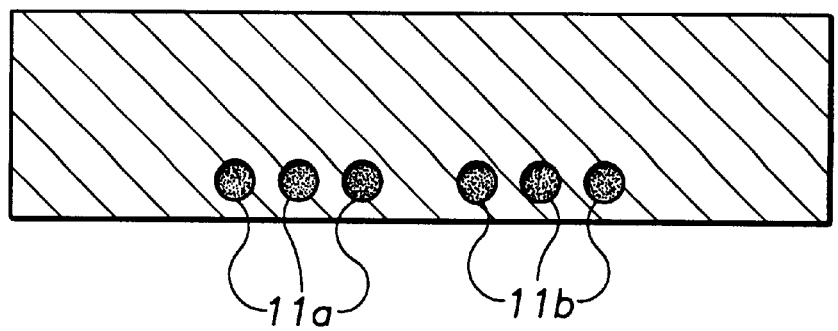
FIG. 20 schematically shows a cross-section of a top fiber in a plasma display with three wire electrodes per sustain electrode.
Figure 21:
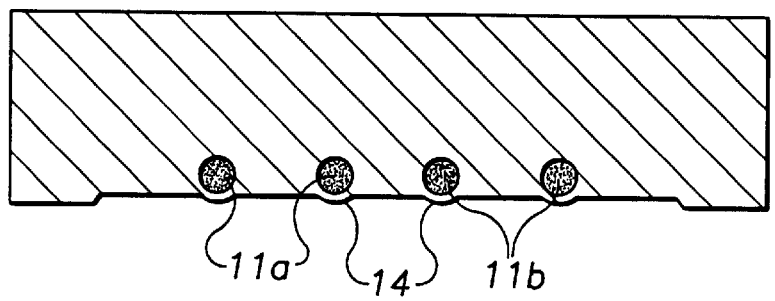
FIG. 21 schematically shows a cross-section of a top fiber in a plasma display with two wire electrodes per sustain electrode and intra-pixel shape.

The sustain electrodes in a standard plasma display (FIG. 1) are typically constructed using narrow metal bus electrodes 13 and wide indium tin oxide (ITO) electrodes 12 to spread the plasma and increase the amount of UV generation. To spread out the electric field in the fiber-based display the sustain electrodes 11 are composed of more than one metal wire. FIG. 19 illustrates a two electrode 11*a* per sustain electrode configuration and FIG. 20 illustrates a three electrode 11*a* per sustain electrode configuration. Intra-pixel control can also be added into the multi-sustain electrode configuration as shown in FIG. 21. The multi-electrode configuration will serve a similar purpose as the ITO electrodes 12 in the standard display. The plasma will be fired over a larger area, hence generating more secondary electrons, which generate more ionization, which generate more UV, which generates more visible light.

Addressing the fiber-based plasma display will require different voltage waveforms because the electrical fields generated from a wire electrode are substantially different than those from a thin metal electrode. It has been noted that addressing a fiber-based plasma display requires longer address pulses to write the display image. The voltage ramp requirements for addressing a display with wire electrodes with be lessened because of the lack of the thin metal edge that enhances the electric field. A cylindrical wire electrode does not have a thin metal edge that enhances the electric field, therefore all the addressing modes of operations will require significantly different electric fields. The exact wave forms for the different modes of operation (erase, write, and voltage ramp) will differ for different intra-pixel fiber shapes as a result of different dielectric thickness around the wire electrodes, location of wire electrodes, and total number of wire sustain electrodes.

The most significant technical issues with current plasma display fabrication are the need for low-cost processes to form barrier ribs and a simpler phosphor coating process (Mikoshiba, SID Int. Symp. Seminar Lecture Notes, M-4/1, 1998). The complex multi-step barrier rib formation process used in the standard plasma display is replaced by a much simpler process in the fiber-based display where the barrier ribs are simply designed into the fiber shape. Phosphor deposition is also simplified in the fiber display since individual fibers are spray coated with a specific color and subsequently arranged in alternating red, green and blue patterns in the bottom fiber array. Spray coating also produces a very uniform coating throughout the channel, as shown in FIG. 7A. The innovative process to fabricate the fiber-based plasma display and other fiber-based displays will be discussed further with reference to FIG. 25.

The fiber-based plasma display is a low cost alternative because it reduces the manufacturing cost by one half. This reduction in manufacturing cost is realized in a more simplified manufacturing process with lower capital and material costs. The fiber-based process has only 13 process steps compared to 25 or more for the standard process. In addition, the process steps are simpler—extrusion and fiber draw compared to multi-level photolithography and precision silk screening. It is expected that fewer process steps will result in higher yields and lower overall cost. Multi-level alignment steps are also eliminated in the fiber-based display process because the entire functionality of the top and bottom plates is contained within each respective fiber. The standard process has two alignment steps to process the top plate and five alignment steps for the bottom plate. These multi-level alignment steps are interleaved with high temperature processes (e.g. firing of address electrode or barrier rib pastes) that mandate the use of expensive specialty glass substrates to minimize the compaction or shrinkage of the glass. The fiber-based process has no multi-level steps, permitting use of low cost soda lime glass substrates for any size display. Since all the process steps are performed on the fibers, no large area vacuum process equipment is needed nor any expensive photolithography processes.

The fiber-based technology can produce a variety of special displays with unique attributes. The fiber-based display technology is the only known direct view technology that can be used to fabricate a curved display. With all the functionality of the display contained within the fibers, which can be wrapped onto a curved surface, a full 360° viewable display can be produced. Large tiled displays with small tiling gaps can also be fabricated, since the electrodes are wires, which can be bent to a 90° angle as they exit the frit region.

Figure 22:
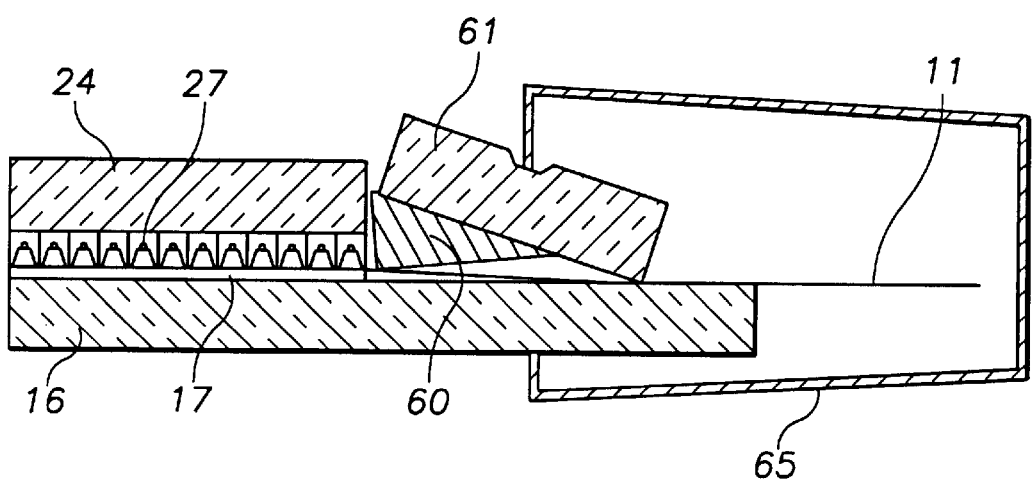
FIG. 22 schematically shows a cross-section of a frit-sealing process using glass tabs to force the frit to flow into the gap between the glass plates.

A further embodiment of the invention, illustrated in FIG. 22, is a glass frit sealing process, which is of particular use in fiber-based displays that contain a hermetically sealed enclosure. The prior art method of frit sealing a display requires that the frit be first applied to at least one of the panels before the panels are clamped together and forced to come into contact as the glass frit flows during the high temperature sealing process step. The present invention uses small strips of glass 61 to force the frit 60 to flow into the gap between the top 16 and bottom 24 glass plates, in turn sealing the plates together. This process is particularly useful since it allows the panel to be assembled before frit is applied to the panel. Assembling before frit sealing will assure that the fibers are locked tight together and no visible gaps exist between the them.

Figure 1:
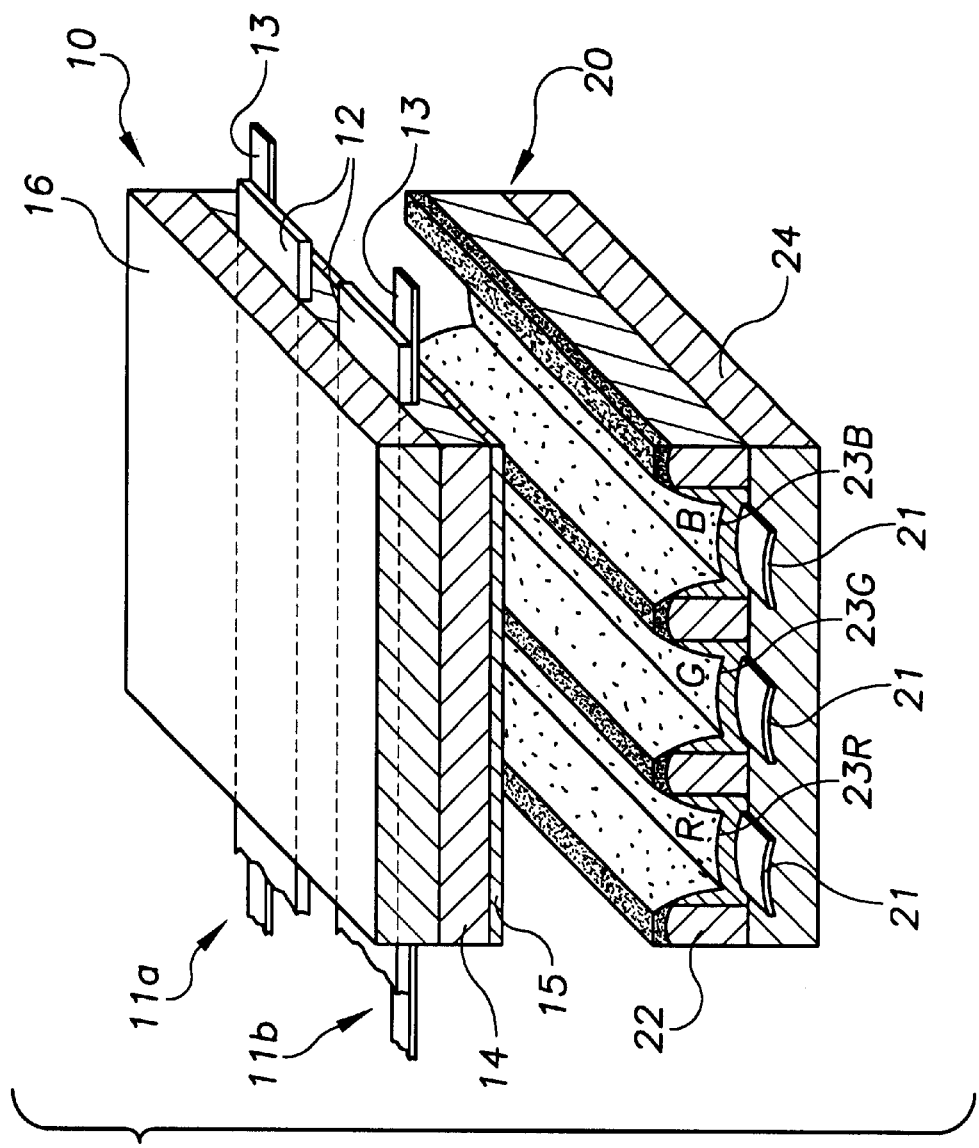
FIG. 1 illustrates a standard plasma display in accordance with the prior art.
Figure 2:
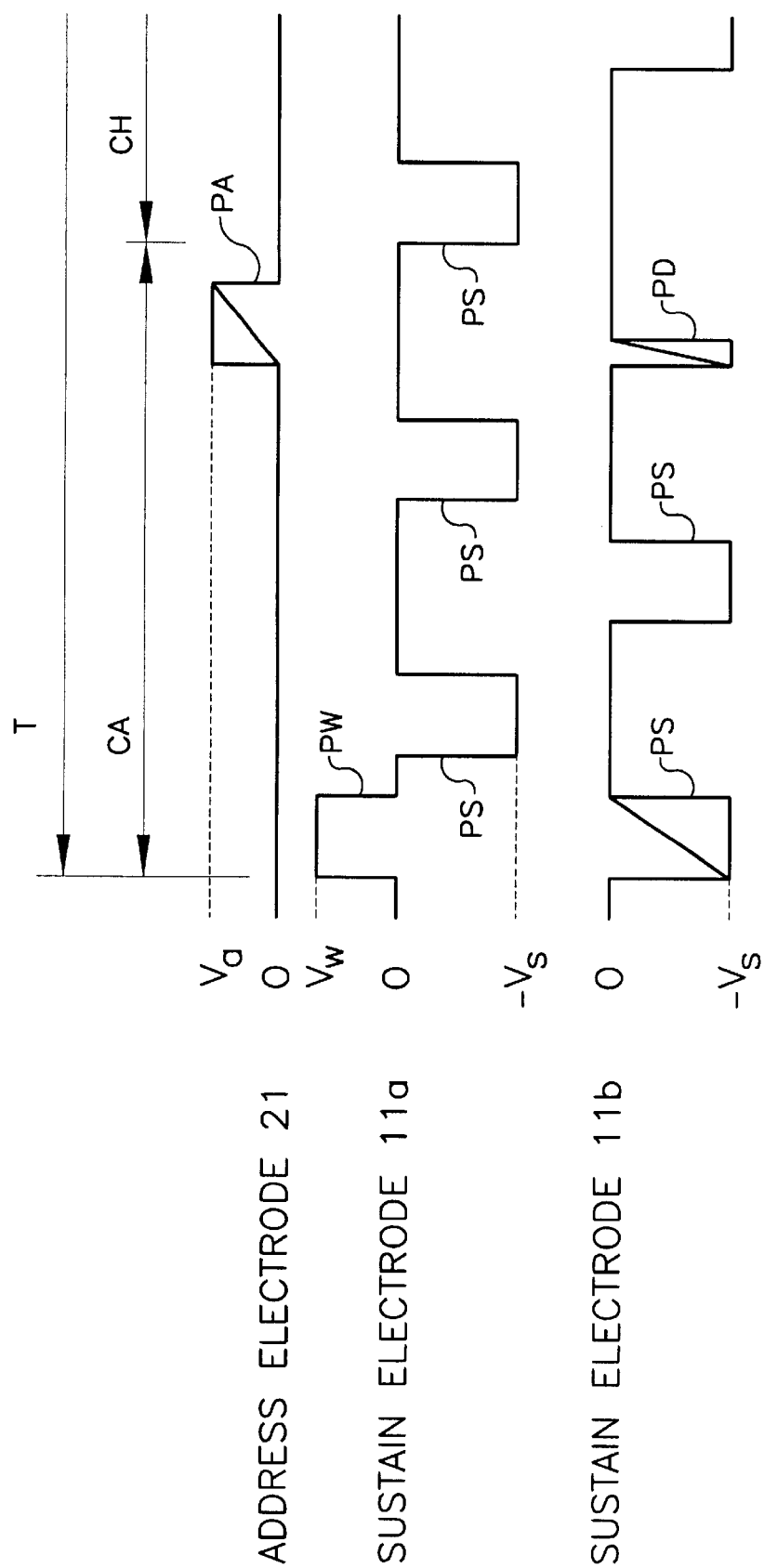
FIG. 2 shows the prior art waveforms for the erase address mode of operation.
Figure 3:
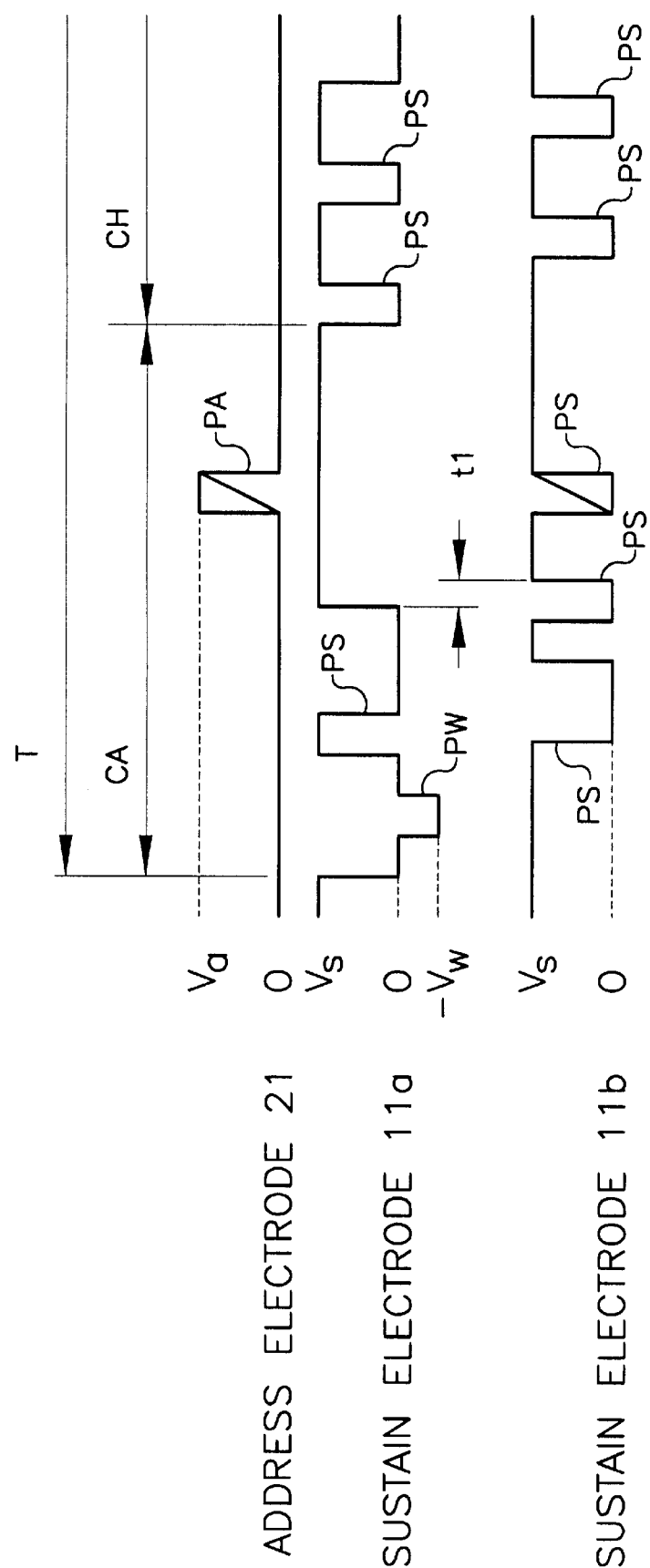
FIG. 3 shows the prior art waveforms for the write address mode of operation.
Figure 4:
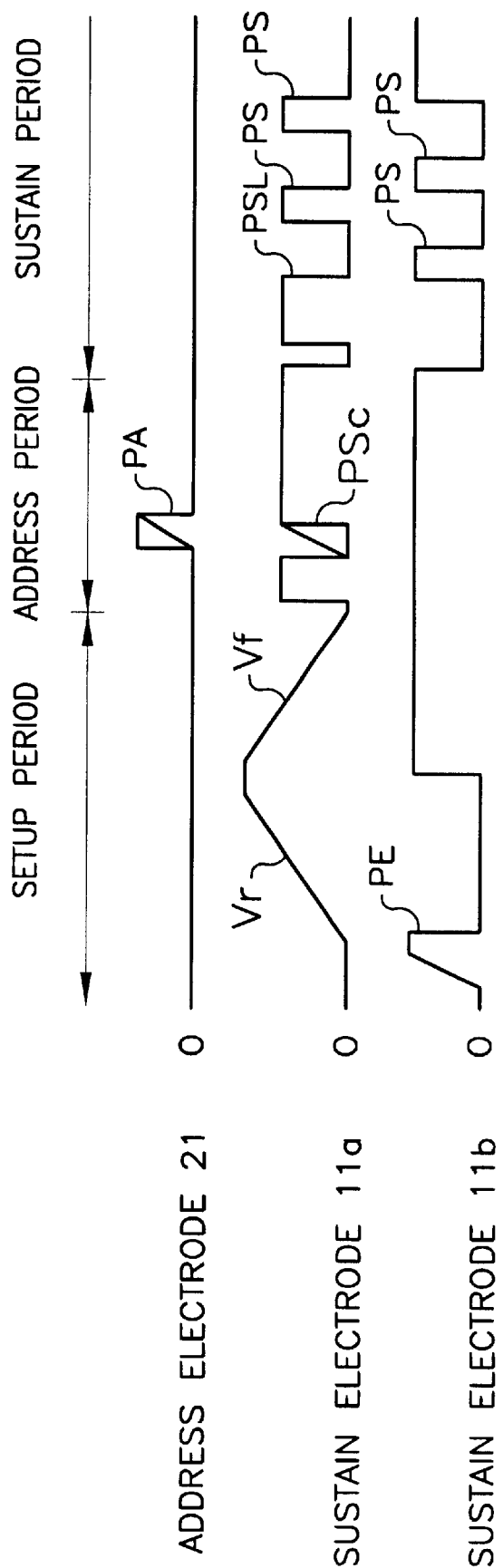
FIG. 4 shows the prior art waveforms for the ramped voltage address mode of operation.
Figure 5:
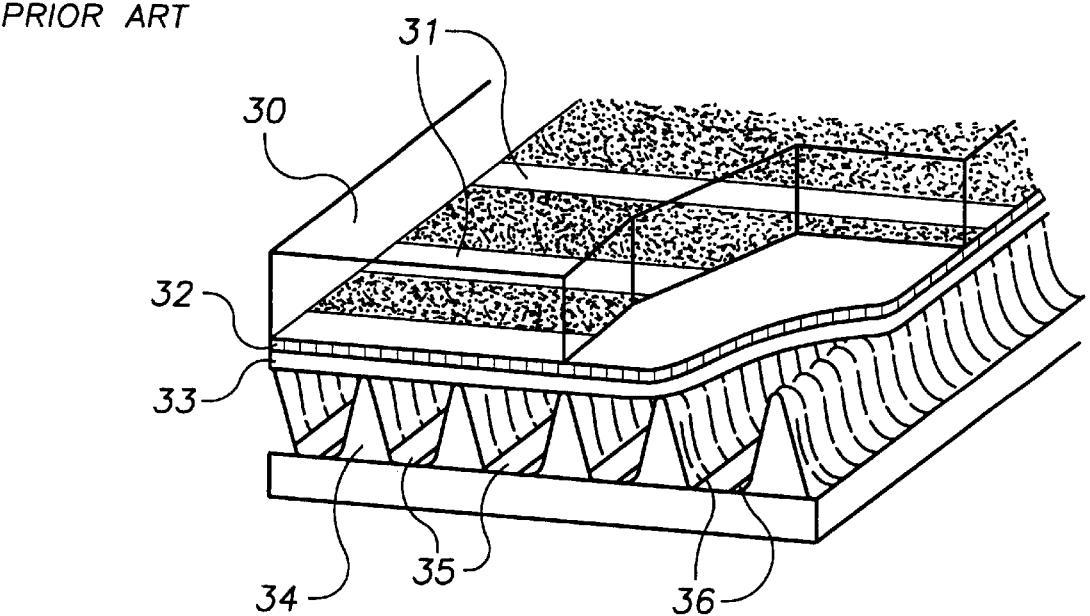
FIG. 5 illustrates a standard PALC display in accordance with the prior art.

The frit-sealing process of the present invention is suitable for standard plasma displays such as shown in FIG. 1. The display panel can be assembled before the frit is applied to the panel and the high temperature sealing process step. However, in this case, the frit needs to be applied to opposite sides of the panel.

Figure 24:
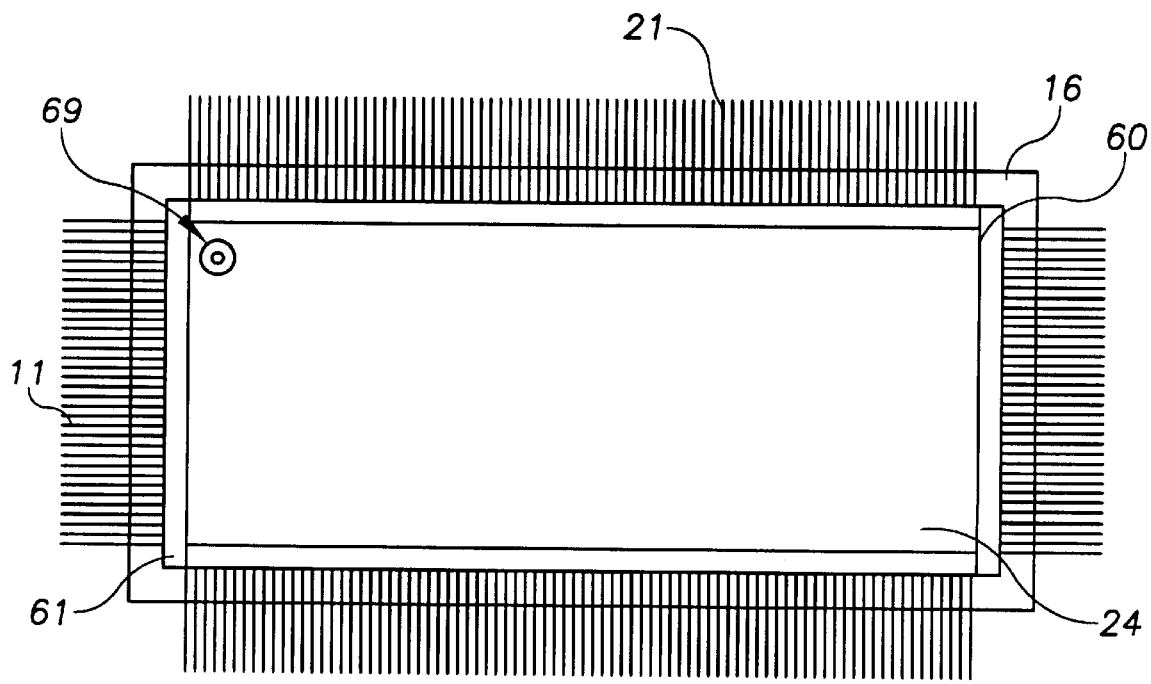
FIG. 24 shows a planar view of the plasma panel frit sealed with glass tabs and wire electrodes extending out through the frit region.
Figure 26A:
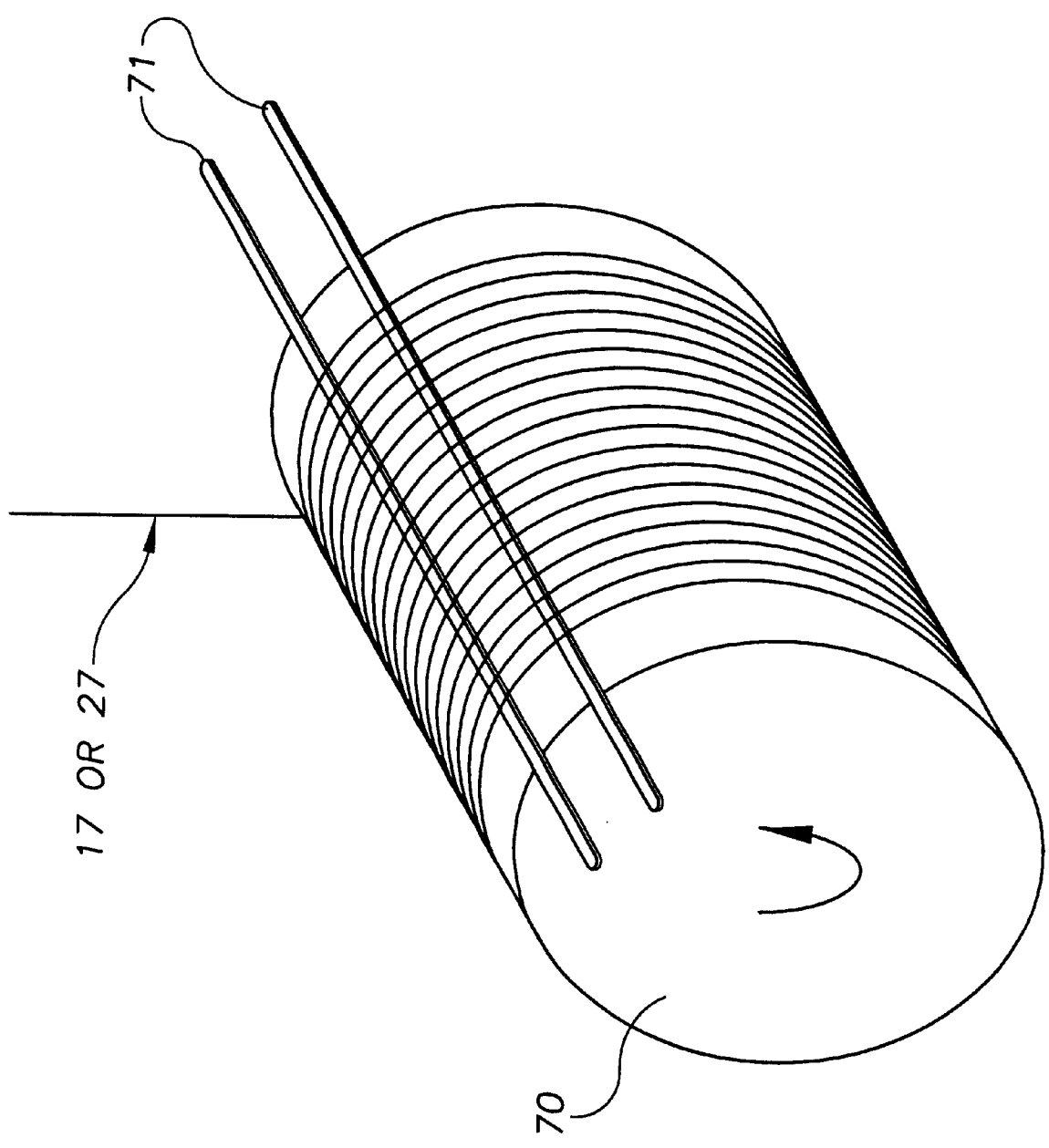
FIG. 26A illustrates the process steps to form a fiber array.
Figure 26B:
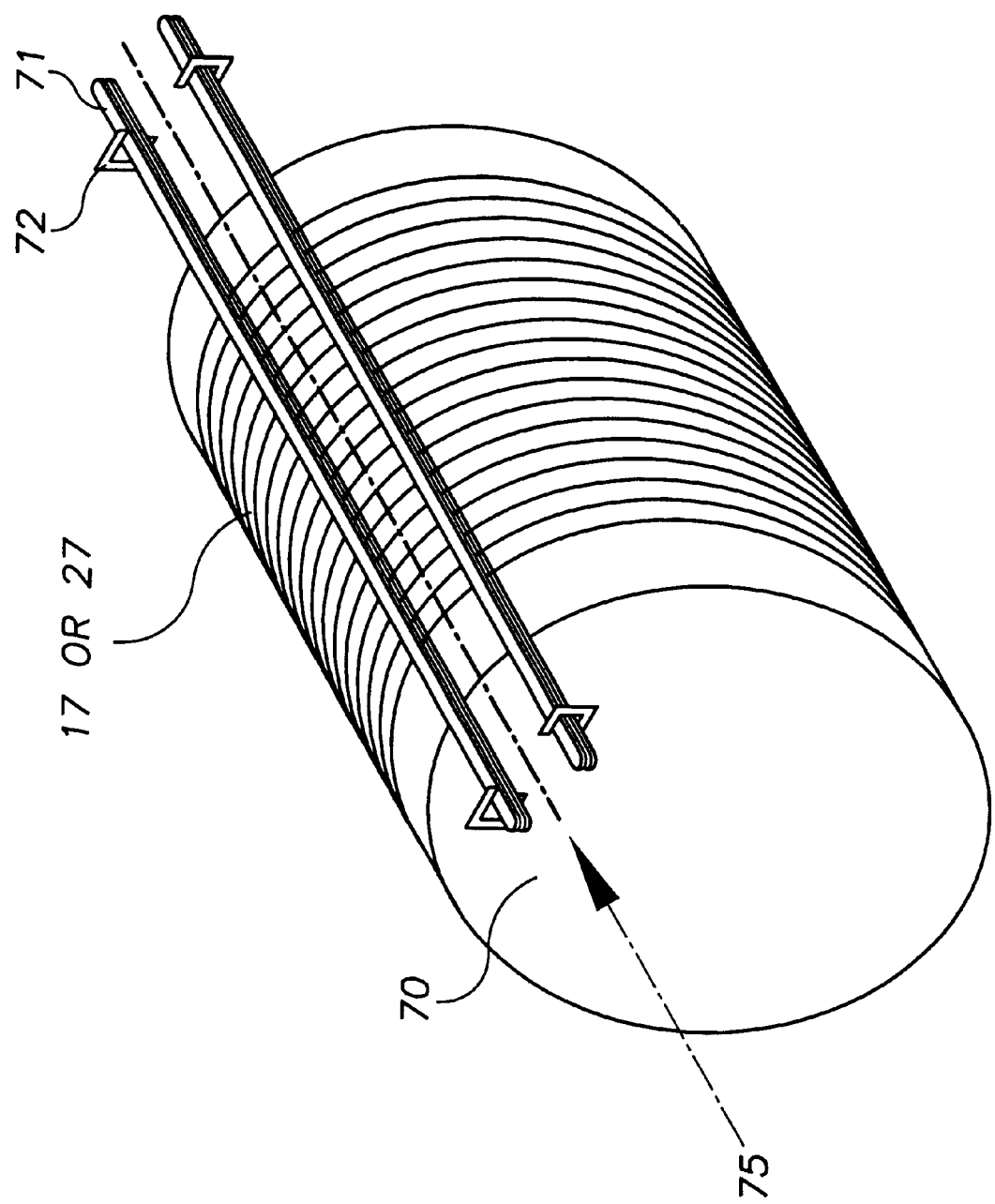
FIG. 26B illustrates the process steps to form a fiber array.
Figure 26C:
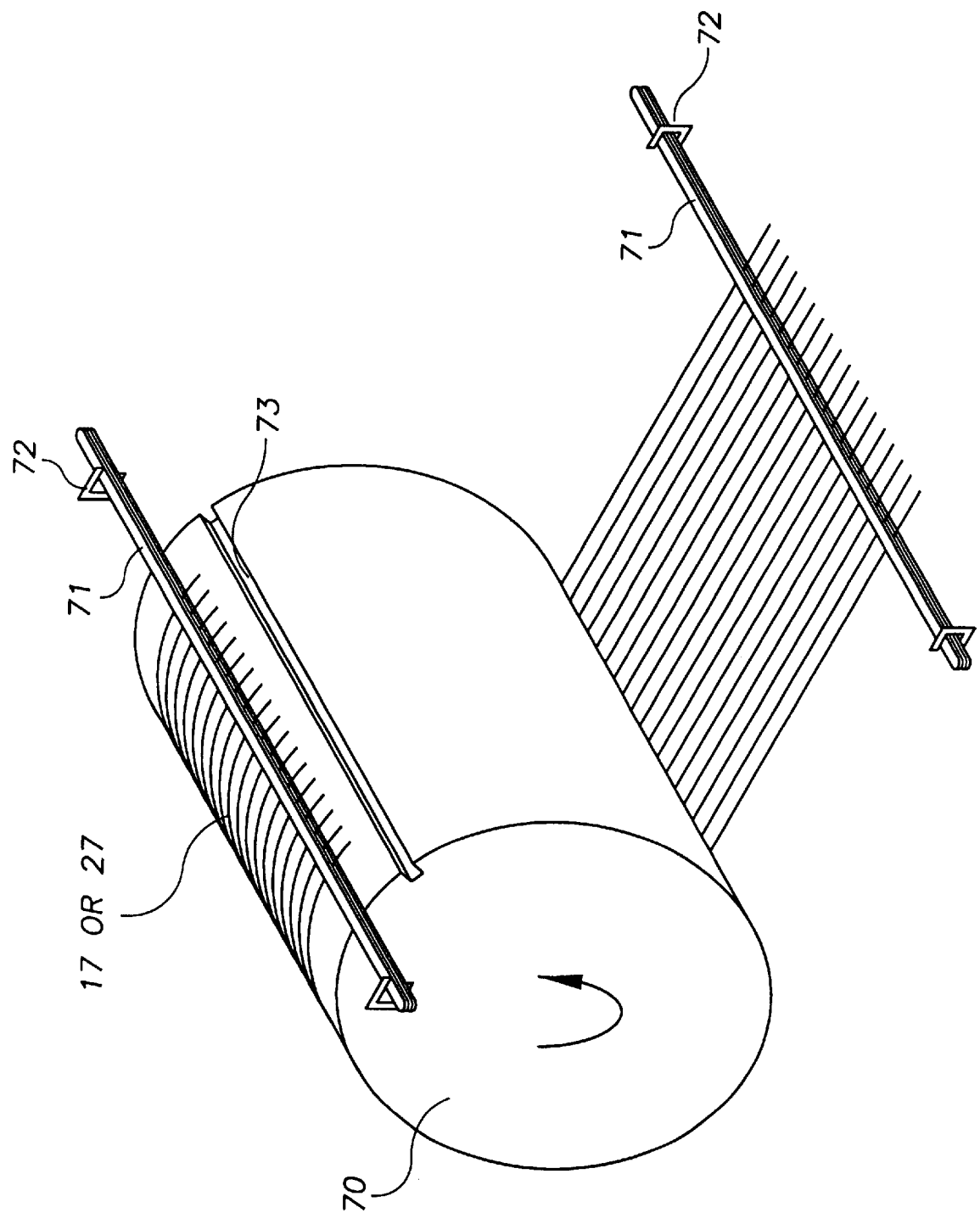
FIG. 26C illustrates the process steps to form a fiber array.
Figure 26D:
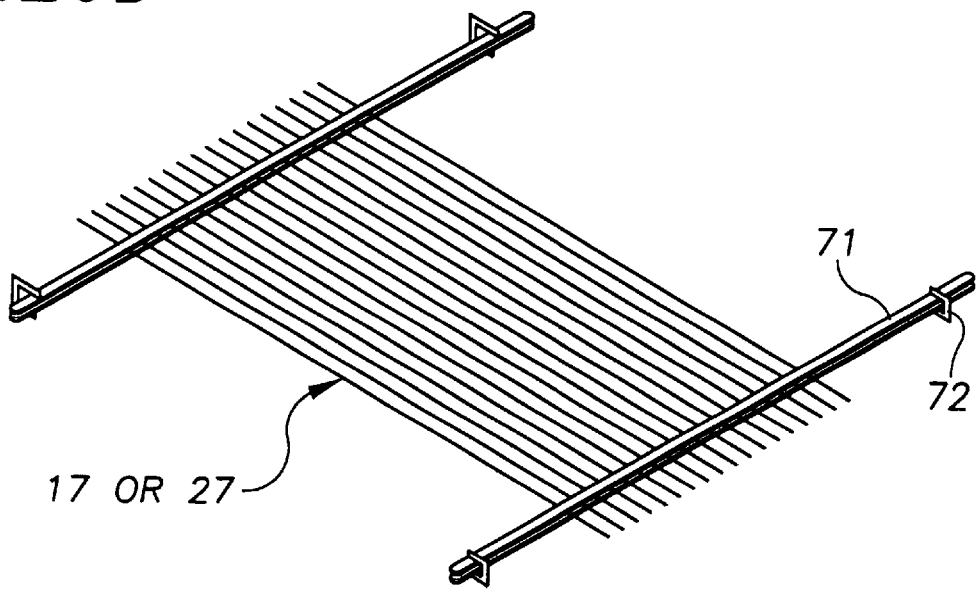
FIG. 26D illustrates the process steps to form a fiber array.

The preferred method of sealing the panel together requires that one of the panels 16 is larger than the other in both directions, such that the frit 60 coated glass tabs 61 can be clamped 65 around the perimeter of the smaller glass plate 24 (FIG. 24). In order for one of the plates of the display to be larger than the other in both directions the electrodes for the smaller plate must exist separate from that plate, such as in the fiber-based displays. The glass of the fibers is removed from the wire electrodes in the frit seal region and the wires are brought out through the frit seal. Under the proper conditions the frit will flow around the thousands of wire electrodes and form a vacuum tight seal.

Exposing the wire electrodes 11 in the top fibers (FIG. 7B) by removing the glass from the wires will allow an arc to form between the bare electrodes at the ends of the top plate fibers during operation. This arcing will occur during the application of the AC voltage to the sustain electrodes 11. Using the new frit sealing process will force the frit to flow between the top and bottom glass plates and cover the ends of the fibers 11a and 11b. Encasing the bare wires in frit will prevent arcing between the electrodes. Therefore, the new frit sealing process adds both a method of assembling the panel before frit sealing to lock the fibers in place and a method of forming a dielectric layer around the wire electrodes to assure proper addressing of the display.

The frit 60 can be applied to the perimeter of the panel after assembly then the glass tabs 61 can be clamped 65 over the frit 60 to force it to flow between the two glass plates. The frit 60 may also be applied to the glass tabs 61 before they are clamped 65 around the perimeter of the panel. The frit 60 may be applied as a paste or glass frit rods or co-extruded or co-slot drawn as part of the glass tab.

Figure 23:
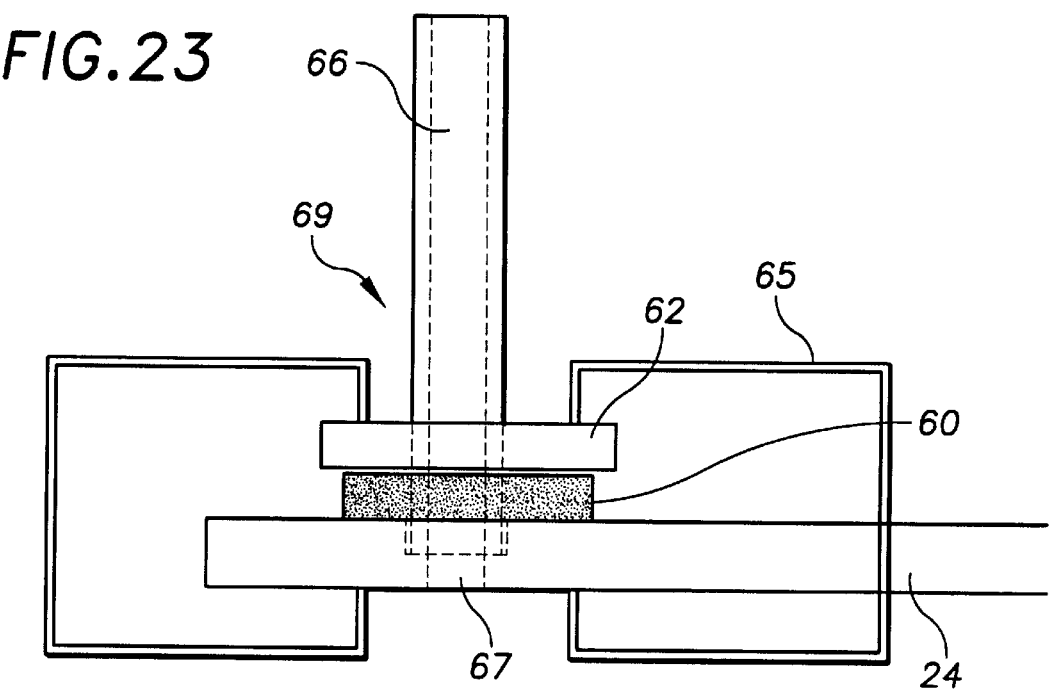
FIG. 23 schematically shows a frit-sealing process to attached the evacuation tube to the plasma panel using a glass washer to force the frit to flow.

A still yet further portion of the invention involves a method of using a glass washer 62 on the evacuation tube 66 clamped 65 over the frit 60 to assist in sealing the evacuation tube 66 to the glass plate 24 (FIG. 23). This application 69 of attaching the evacuation tube to the display uses the same forced frit flow concept as that explained above. The evacuation tube 66 is placed into a countersunk hole in the glass plate that has a small hole 67 placed through the plate to evacuate the panel. The frit 60 can be placed around the tube 66 as a paste or a glass frit washer and the glass washer 62 clamped 65 over it or may be included as part of the glass washer itself preferably as a paste.

The forced frit flow sealing method is particularly useful when fabricating curved displays because the panel has to be assembled before it is sealed together to assure intimate contact between the two plates especially for a 360° viewable display. Also, all curved displays will have non-flat surfaces; therefore gravity can not be conveniently used to flow the frit in the desired direction.

A further embodiment of the invention, illustrated in FIG. 26, is a method of forming an array of fiber for the fiber-based display. Fiber (17 or 27) from the fiber draw process or from another process is wound onto a rotating drum 70 (FIG. 26A). Previous to the fiber winding process two rigid rods 71 are placed into the grooves 73 in the drum. After the fiber winding process a second set of rigid rods 71 are clamped 72 over the fiber (17 or 27) to the first set and the fiber are cut 75 between the two pair of rods 71 (FIG. 26B). One set of rods 71 is removed from its groove 73 and the fibers (17 or 27) are unraveled from the drum 70 as a sheet (FIG. 26C). Once the fibers (17 or 27) are totally unraveled from the drum 70 and the other set of rods 71 is removed from its groove 73 a self supported array of fibers (17 or 27) is formed (FIG. 26D). The preferred method of forming fiber arrays for fiber-based displays is described above. The key to the invention is to form an array of fibers from a cylindrical drum. There are several different methods of forming a fiber array from a cylindrical drum without departing from the spirit and scope of the invention, such as the following. Draw the fiber onto a rotating drum. Place the fiber wound drum on a flat surface. Hold the fiber tight to the drum above the flat surface. Cut the fibers between the flat surface and the location of where the fibers are being held to the drum. Hold the other end of the cut fibers to the flat surface and roll the drum on the flat surface to unwind the fibers. As the end of the fibers are rolled off the drum hold that end onto the flat surface to form an array of fibers.

Figure 27:
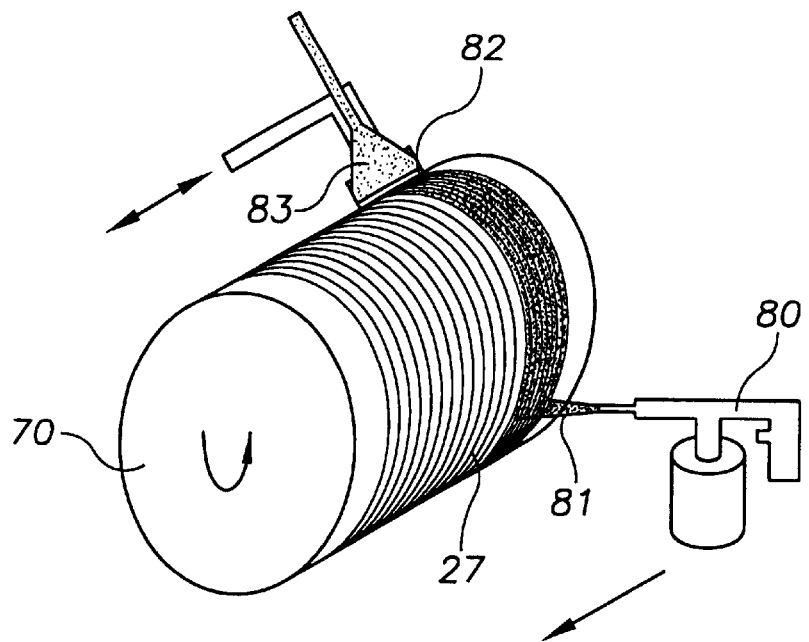
FIG. 27 illustrates a process to coat phosphor in the fiber channels on a rotating drum and remove the excess from the top of the barrier ribs.
Figure 28A:
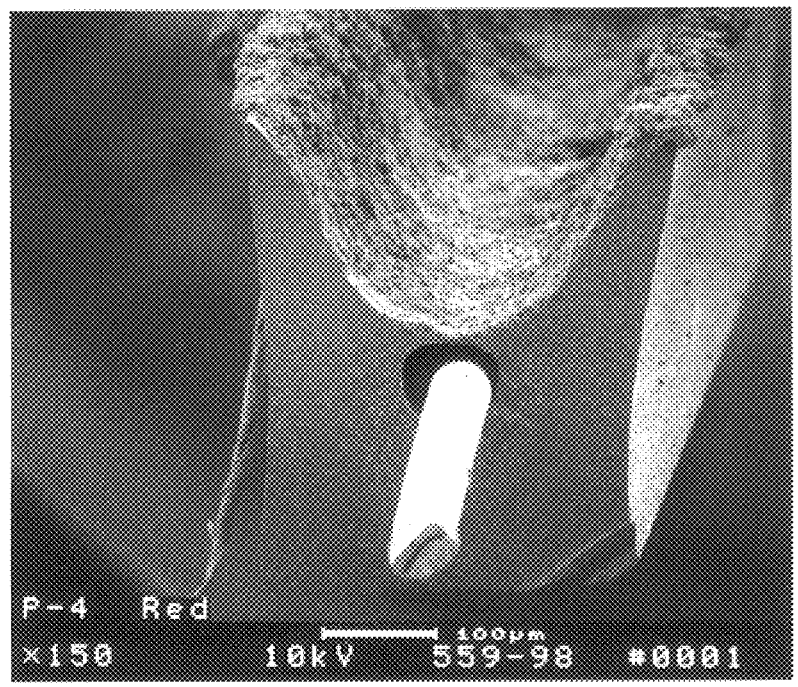
FIG. 28A shows and SEM of a phosphor coated bottom fiber.
Figure 28B:
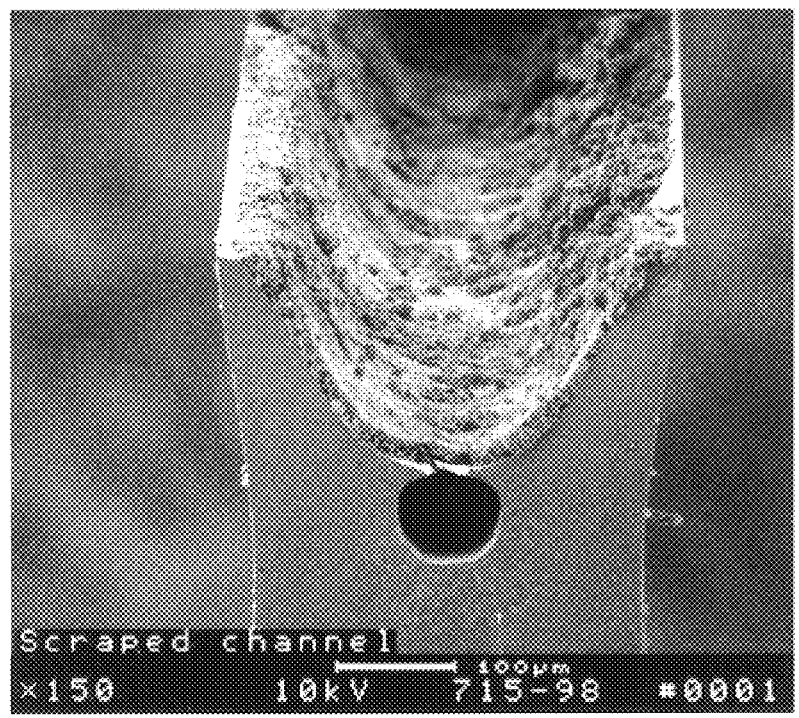
FIG. 28B shows a SEM similar to that illustrated in FIG. 28a with the phosphor removed from the top of the barrier ribs.

A typical process flow chart to fabricate a fiber-based plasma display is shown in FIG. 25. The innovative process starts by preparing the glass plates, which consists of cutting them to size, edging the glass and drilling the evacuation hole in the bottom plate. Next, the bottom and top fiber preforms are formed using hot glass extrusion. These preforms are then loaded into a fiber draw tower, wire is fed through the holes in the preform and fiber containing the wire electrode is drawn onto a rotating cylindrical drum (similar to that shown in FIG. 6). The bottom fiber is drawn onto the cylindrical drum with the plasma channel facing outward. Three separate drums containing fibers are wound to be subsequently coated with red, green and blue phosphors. The phosphor 81 is applied to the channels of the fibers 27 using a spaying process 80, shown in FIG. 27. The fibers are wrapped tight to each other to prevent phosphor from getting between the fibers and creating a gap in the subsequent panel fabrication process. The phosphor on the top of the barrier ribs is removed by scraping 82 it off and vacuuming 83 it away. The typical build-up of phosphor on the top of the barrier rib is shown in FIG. 28A. If a vacuum 83 is added to the scraping process 82 the phosphor is only removed from the top of the barrier rib and is not disturbed in the channel (FIG. 28B). After three separate drums are coated with red, green, and blue phosphors, they are sequentially rewound onto a single drum in the required RGB sequence. Sheets of bottom fibers can then be formed using the fiber array forming process explained in detail above.

Once the top plate fiber is drawn onto a rotating drum, the side of the fiber facing the plasma channel needs to be coated with a MgO film. The quality of the MgO film has a drastic effect on the UV generation and the firing voltages of the plasma cell. A high quality MgO film is one that has a high secondary electron emission and charge storage capacity, which will yield a display with low sustain and address voltages with high UV emission. The MgO film can be coated on the fiber in a multitude of fashions. The standard method of coating the top plates in the plasma industry is to use physical vapor deposition. E-beam deposition is the standard process, however sputtering the MgO is gaining support. The ability to spray coat the MgO film will result in a process with no vacuum process steps and considerably lower fabrication cost. High quality MgO films have been demonstrated using MgO powder by Ichiro Koiwa, et al. at Oki Electric (J. Electrochem. Soc., Vol. 142, No. 5, '95, pg. 1396–1401; Elec. Comm. in Jap, Part 2, Vol. 79, No. 4, '96, pg. 55–66; IEICE Trans. Elect., Vol. E79-C, No. 4, '96, pg. 580–585). The preferred method of coating the fibers with a MgO film is to spray the MgO film on the to fibers while wrapped on the cylindrical drum similar to the phosphor coating technique.

The fibers may also be removed from the drum as a sheet and spray coated with the MgO film. Different vehicles, such as water, alcohol, and magnesium nitrate salt as a binder may be mixed with a MgO powder to be sprayed on the top fibers. The fibers may be coated using the standard coating techniques of e-beam deposition or sputtering by removing the fibers as a sheet and then coating them, or by placing the cylindrical drum with the wound fibers into a coating system and coating them while on the drum. The fibers may also be coated a single fiber at a time or a small number of fibers at once in a small coating system, where the fiber is spooled through the system and taken-up by another drum. The small vacuum coating system could have variable loadlocks on both ends or large chambers to support the cylinders and the fiber could be coated in a reel-to-reel system Once the top fiber is coated with a MgO film and formed into a sheet, it is assembled orthogonal to the bottom fiber array and sandwiched between the two previously prepared soda lime glass plates (FIG. 8). The top glass plate is place on a flat surface and the top fiber array is place on top of it with the MgO film facing away from the glass plate. The bottom fiber array is placed on top of the top fiber array channel down and the bottom glass plate is placed on top of the stack. Note that the bottom glass plate is smaller than the top glass plate in all directions in the plane of the plates. Before the frit is applied to the perimeter of the bottom plate, the glass from the fibers is removed from the wire electrodes in the frit seal region. The evacuation tube and frit seal assembly is assembled on the panel. Narrow glass tabs with frit are clamped around the perimeter of the bottom glass plate and the panel is sealed together in a furnace, where the glass tabs force the frit to flow between the glass plates (FIG. 24). The panel is evacuated and backfilled with a xenon-containing gas, and the wire electrodes are connected to the drive electronics.

While much of the above description has been directed to plasma displays, many embodiments of the present invention are also applicable to plasma addressed liquid crystal (PALC) displays and field emission displays (FED). The invention could be employed to form fiber-based PALC displays as discussed below and spacers and structure in a FED display.

Another portion of the invention is to produce fiber-based PALC displays using fibers, for example in FIGS. 9, 29–34. A method of fabricating a PALC display using hollow fibers for the bottom plate is disclosed in the parent application. However, the fiber shape was a rectangular tube that required a small vacuum in the centerline of the draw to produce fiber with a flat dielectric 33 at the top of the fiber. This tight tolerance on flatness with the hollow fiber has not yet been achieved. The preferred embodiment disclosed within is to use a tapered barrier rib or side wall of the plasma channel and a thicker glass bottom for the bottom fiber. These additions, discussed in detail above, will prevent the top of the fiber from changing shape during the draw process, hence producing a bottom fiber with a thin flat dielectric layer between the plasma channel and the liquid crystal layer. Another preferred embodiment is to use fibers for the top plate of the PALC display. These fibers, shown in FIGS. 30A through 30C, may have one embedded address electrode 31 or several embedded address electrodes tied together at the ends of the fiber and attached to the drive electronics or individually addressed. The spacer 90 for the liquid crystal material may also be built into the top fiber. Building the spacer 90 into each fiber will help control the gap between the fiber arrays, hence controlling the thickness of the liquid crystal and the operation of the display. Large variations (>3 $\mu$m) in the liquid crystal gap will create variations in viewing angle and gray scale of the individual pixels. Therefore, building a spacer into each fiber will greatly enhance the operation of the display, especially in large display sizes.

The only section of the fiber-based PALC display (e.g., FIG. 9) that has to be composed of glass is the bottom fibers 27. The bottom fibers 27 should preferably be constructed from a glass or inorganic compound in order to contain a plasma gas without contaminating the gas. All the other structures in the panel can be composed of plastic, such as the top fibers, top plate, and bottom plate. Creating a display mainly composed of plastic will produce a very lightweight panel.

Figure 30A:
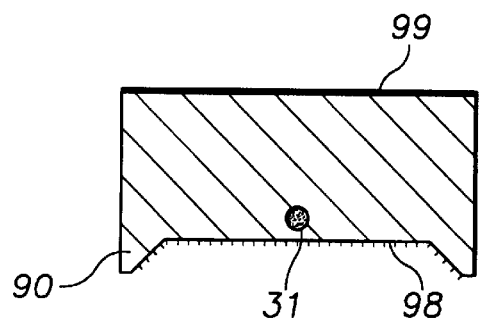
FIG. 30A schematically shows a cross-section of the top fiber in a PALC display with one address electrode.
Figure 30B:
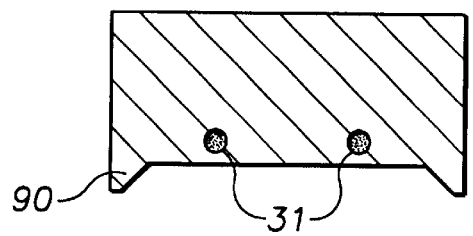
FIG. 30B schematically shows a cross-section of the top fiber in a PALC display with two address electrodes.
Figure 30C:
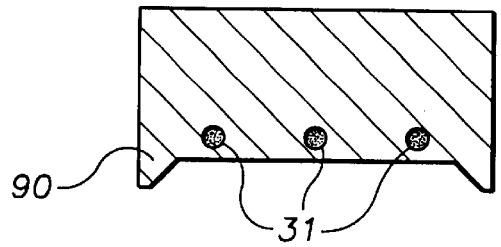
FIG. 30C schematically shows a cross-section of the top fiber in a PALC display with three address electrodes.
Figure 31:
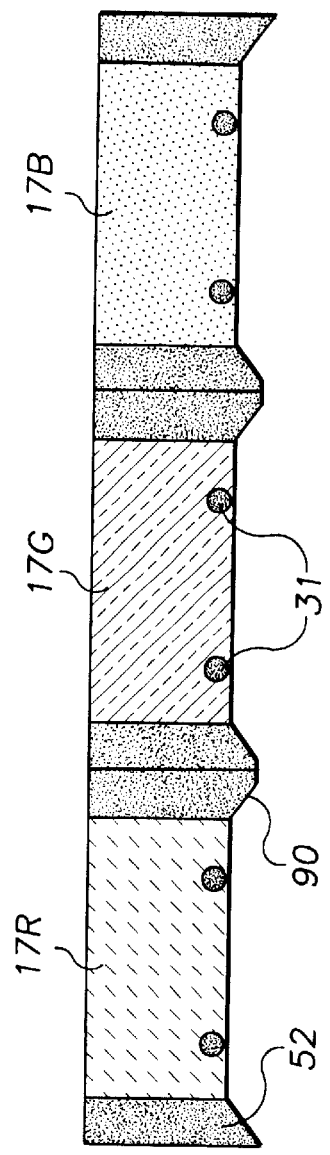
FIG. 31 schematically shows a cross-section of top fiber in a PALC display with integrated color filter and black matrix pattern.
Figure 32:
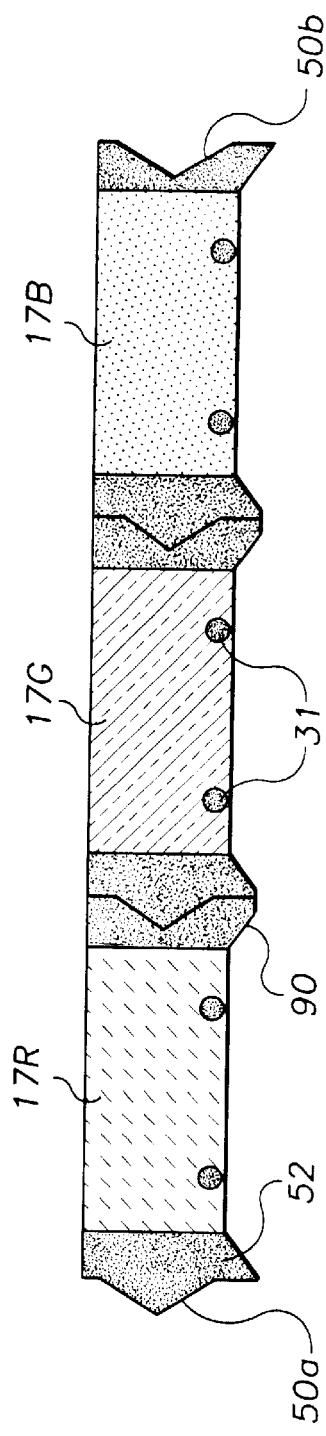
FIG. 32 schematically shows a cross-section of top fiber in a PALC display with integrated color filter, black matrix pattern and interlocking structure.

A further embodiment of the invention is to add color and optically absorbing regions in the top fibers in the PALC display to create a color filter and black matrix function. The top fiber may be composed of a colored glass or plastic to add color to the display or a colored die may be applied to the surface of the fiber (similar to layer 99 shown in FIGS. 29 and 30A) to add color to the display. FIG. 31 illustrates a top fiber array with built-in liquid crystal spacers 90 and address electrodes 31 consisting of alternating red 17R, green 17G and blue 17B colored fibers. FIG. 31 also illustrates an integral black matrix 52 function built into the fibers. This absorbing region may be included into the top fiber or produced by coating at least one edge of the fiber with an absorbing die. In addition to the black matrix 52 and color filter (17R, 17G and 17B) an interlocking mechanism 50 can be built into the fibers, as illustrated in FIG. 32. The interlocking mechanism will have the advantage of helping to control the variation in cell gap between fibers and the visible gap between fibers, as discussed above.

Figure 29:
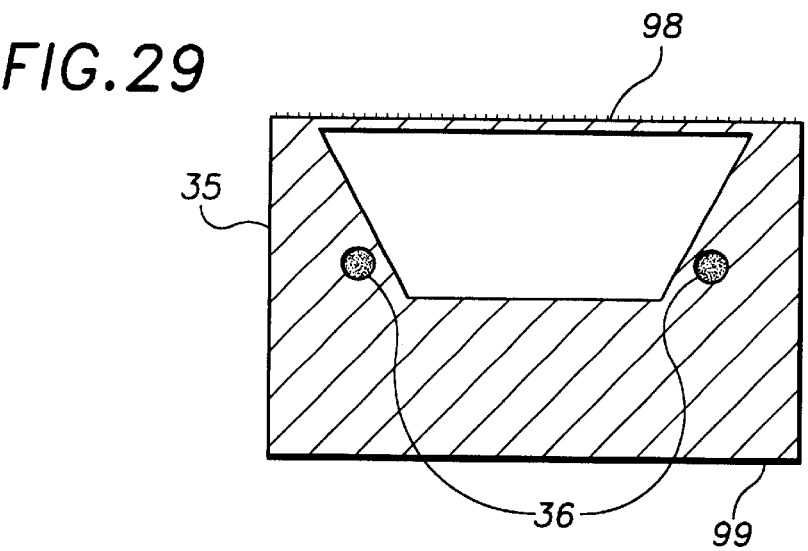
FIG. 29 schematically shows a cross-section of a bottom fiber in a PALC display.

A still yet further portion of the invention involves applying both the polarizing film 99 and the liquid crystal alignment layer 98 to the fibers in the PALC display. The polarizing film 99 can be applied to the surface of the top and bottom fibers, as illustrated in FIGS. 29 and 30A. The polarizing film can be applied to the fibers while they are drawn, wrapped around the drum, or after they are formed as a sheet of fibers. The polarizing film can also be built into the fibers by simply including a composition that becomes polarizing when stretched in the draw process into a section of the initial preform. The liquid crystal alignment layer 98 can be added to the fiber during the draw process, while wound on the cylindrical drum, or after the fibers are removed from the drum as a sheet. In order for proper operation of the liquid crystal the alignment layer 98 should be applied to both the top and bottom fibers, as illustrated in FIGS. 29 and 30A.

PALC displays that operate in a transflective (transmissive and reflective) mode of operation can be constructed using partially reflective bottom fibers. It is desirable that the fibers be made to reflect as much of the incident light coming from outside the panel through the liquid crystal as possible. Thus, in a preferred embodiment, the bottom fibers in the PALC display are made to be capable of reflecting at least 25 percent, and more preferably at least 50 percent, of the incident light. This can be achieved, for example, by fabricating the fibers from a reflecting glass (such as an opal glass or glass-ceramic) or applying a partially reflective coating to the bottom fibers.

Figure 34B:
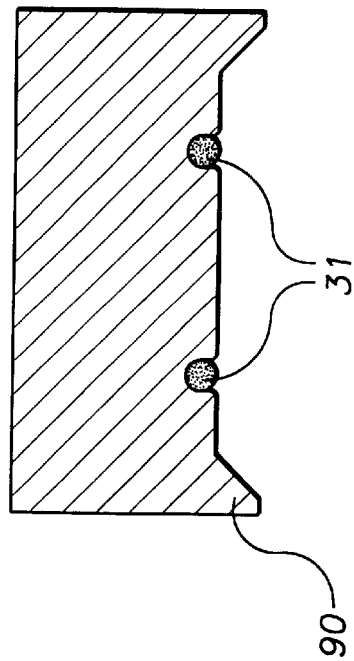
FIG. 34B schematically shows a cross-section of the top fiber in a PALC display partially formed using a loss glass process.
Figure 34A:
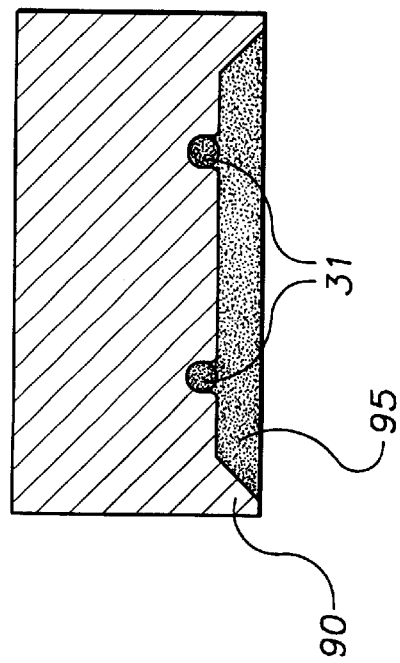
FIG. 34A schematically shows a cross-section of the top fiber in a PALC display partially formed using a loss glass process.

A further embodiment of the invention is to use a loss glass process to create an exposed wire electrode or hold tolerance in a fiber, as illustrated in FIGS. 33 and 34. A dissolvable glass 95 can be co-extruded with the base glass 27 to form a preform for fiber draw. The wire electrodes (36 or 31) can be drawn into the fiber and the dissolvable glass 95 can be subsequently removed with a liquid solution. Typical liquid solutions to dissolve the glass include vinegar and lemon juice. A dissolvable glass 95 may be used to hold the wire electrode in a particular location during the draw process. When the dissolvable glass 95 is removed the fiber becomes exposed to the environment outside the fiber. A dissolvable glass 95 may also be used to hold a tight tolerance in a fiber during the draw process, as illustrated in FIG. 33B. In this example, the dissolvable glass 95 is used to assure that the thin membrane that forms the dielectric layer between the plasma channel 36 and the liquid crystal remains flat during the fiber draw process. A dissolvable glass may also be used to create a unique shaped plasma channel in a fiber plasma display or one with steep sidewalls and narrow barrier ribs.

The preferred embodiment also includes a process for fabricating the fiber based PALC display, similar to that discussed above for fabricating fiber plasma displays. Both top and bottom fibers are drawn from a preform with their corresponding wire electrodes. The fibers with wire electrodes may also be extruded directly from the extrusion machine. In either case they are wound onto a cylindrical drum. The top fibers are processed with their constituent coatings, if any, and rewound onto a separated drum in a red, green, blue sequence. The bottom fibers which are wound on the cylindrical drum are gas processed before they are removed from the drum. Before gas processing, an emissive material may be applied inside the plasma channel 36. This emissive film may be applied by placing a vapor or liquid through the hollow channel in the fiber. An example would be a liquid solution of magnesium nitrate salt that could be placed into the hollow fibers and converted to a MgO containing film upon heating. Also, any dissolvable glass used to hold shape or expose a wire electrode should also be removed before gas processing. To gas process the fibers, the two ends of the fibers should be connected to a gas processing system and the proper pressure and gas type applied to the hollow fiber array wound around the drum. After establishing the proper gas conditions the fibers are sealed in two parallel strips along the axis of the cylindrical drum. By cutting the fibers between the sealed regions, they can be removed from the drum as a gas processed array of bottom fibers. The two fiber arrays can be sandwiched between the plates and the seal and liquid crystal added to the panel. Once the glass or plastic is removed from the wire electrodes, they can be connected to the drive electronics for panel operation.

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

What is claimed is:

1. A process to frit-seal a panel of an information display together, comprising:
    assembling said panel; and
    sealing, after said step of assembling, said panel by forcing a glass frit to flow between two glass plates that comprise said panel using narrow strips of glass.

2. A process according to claim 1, wherein said glass frit is applied to a perimeter between said two glass plates before said narrow strips of glass are clamped over said glass frit thereby forcing said glass frit to flow between said glass plates during a high temperature sealing step.

3. A process according to claim 1, wherein said glass frit is applied to said narrow strips of glass as a paste or co-extruded with said glass strips, which are then clamped around a perimeter between said two glass plates thereby forcing said glass frit to flow between said glass plates during a high temperature sealing step.

4. A process to frit-seal a panel of a fiber-based display together, comprising:
    assembling at least one array of fibers between two glass plates; and
    sealing, after said step of assembling, said glass plates together by forcing a glass frit to flow between said two plates using narrow strips of glass.

5. A process according to claim 4, wherein one of said glass plates is smaller than the other in all directions in a plane of said plates.

6. A process according to claim 4, wherein said panel is frit-sealed together by first assembling said panel then applying said glass frit.

7. A process according to claim 6, wherein said glass frit is applied around a perimeter of said panel then said narrow strips of glass are clamped over said glass frit to force said glass frit to flow into a gap between a top and a bottom glass plate during a high temperature sealing step.

8. A process according to claim 6, wherein said glass frit is applied to said narrow strips of glass as a paste or co-extruded with said glass strips, which are then clamped around a perimeter of said panel to force said glass frit to flow into a gap between a top and a bottom glass plate during a high temperature sealing step.

9. A process according to claim 4, wherein said fibers in said array of fibers contain wire electrodes which extend through said glass frit.

10. A process according to claim 9, wherein said glass flit is forced to flow over ends of said fibers to dielectrically isolate said wire electrodes.

11. A process according to claim 4, wherein said glass plates are curved to form a curved display up to 360°.

12. A process to frit-seal an evacuation tube to a panel of an information display by using a glass washer over an evacuation tube to force a glass frit to flow between said tube and said panel.

13. A process according to claim 12, wherein said glass frit is applied around a base of said evacuation tube then said glass washer is placed over said tube and clamped over said glass frit to force said glass frit to flow between said tube and panel during a high temperature sealing step.

14. A process according to claim 12, wherein said glass frit is applied to said glass washer which is then placed over said tube and clamped to said panel to force said glass frit to flow between said tube and panel during a high temperature sealing step.

* * * * *

UNITED STATES PATENT AND TRADEMARK OFFICE
CERTIFICATE OF CORRECTION

PATENT NO. : 6,354,899 B1
DATED : April 8, 2002
INVENTOR(S) : Moore, Chad Byron

It is certified that error appears in the above-identified patent and that said Letters Patent is hereby corrected as shown below:

<u>Title Page,</u>
Item [56], additional References Cited:

| -- | U.S. PATENT DOCUMENTS | | |
|---|---|---|---|
| 3,602,754 | 8/1971 | Pfaender et al. | 313/108 |
| 3,829,734 | 8/1974 | Schofield | 313/217 |
| 3,876,906 | 4/1975 | Walters | 315/169 |
| 3,906,451 | 9/1975 | Strom | 340/166 |
| 3,927,342 | 12/1975 | Bode et al. | 313/188 |
| 3,947,722 | 3/1976 | Strom et al. | 315/169 |
| 3,969,718 | 7/1976 | Strom | 340/324 |
| 3,990,068 | 11/1976 | Mayer et al. | 340/324 |
| 4,099,082 | 7/1978 | Chodil et al. | 313/188 |
| 5,198,723 | 3/1993 | Parker | 313/516 |
| 5,126,632 | 6/1992 | Parker | 313/634 |
| 5,458,519 | 10/1995 | Lee et al. | 445/24 |

Signed and Sealed this

Twenty-fourth Day of September, 2002

Attest:

JAMES E. ROGAN
Attesting Officer
Director of the United States Patent and Trademark Office